US012581221B2

(12) United States Patent
Park et al.

(10) Patent No.: US 12,581,221 B2
(45) Date of Patent: Mar. 17, 2026

(54) COMPARATOR AND IMAGE SENSOR INCLUDING THE SAME

(71) Applicant: Samsung Electronics Co., Ltd., Suwon-si (KR)

(72) Inventors: Injun Park, Suwon-si (KR); Jaehong Kim, Suwon-si (KR); Jinwoo Kim, Suwon-si (KR); Daehwa Paik, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 18/407,717

(22) Filed: Jan. 9, 2024

(65) Prior Publication Data

US 2024/0259713 A1    Aug. 1, 2024

(30) Foreign Application Priority Data

Feb. 1, 2023    (KR) ........................ 10-2023-0013598

(51) Int. Cl.
*H04N 25/78* (2023.01)
*H04N 25/709* (2023.01)

(52) U.S. Cl.
CPC .......... *H04N 25/78* (2023.01); *H04N 25/709* (2023.01)

(58) Field of Classification Search
CPC .... H04N 25/78; H04N 25/709; H03K 5/2481; H03M 1/56
See application file for complete search history.

(56) References Cited

U.S. PATENT DOCUMENTS

| | | | |
|---|---|---|---|
| 9,774,811 | B1 | 9/2017 | Ebihara et al. |
| 10,079,990 | B2 | 9/2018 | Ebihara et al. |
| 10,986,298 | B2 | 4/2021 | Jung et al. |
| 11,012,649 | B2 | 5/2021 | Guidash et al. |
| 11,350,056 | B2 | 5/2022 | Tomita et al. |

(Continued)

FOREIGN PATENT DOCUMENTS

JP        H07193442 A      7/1995

OTHER PUBLICATIONS

An Ultra Low Energy 12-bit Rate-Resolution Scalable SAR ADC for Wireless Sensor Nodes, Verma et al., IEEE Journal of Solid-State Circuits, vol. 42, No. 6, pp. 1196-1205, Jun. 2007 (Year: 2007).*

(Continued)

*Primary Examiner* — Nicholas G Giles
(74) *Attorney, Agent, or Firm* — Wolf, Greenfield & Sacks, P.C.

(57)        ABSTRACT

Provided are a comparator and an image sensor including the same. The comparator includes a first input transistor including a gate connected to a first input node, a second input transistor including a gate connected to a second input node, a first load transistor including a drain connected to the first input transistor, a second load transistor including a drain connected to the second input transistor, a first shift transistor including a drain connected to the first load transistor, a second shift transistor including a drain connected to the second load transistor, a first bottom switch connected to the first load transistor in parallel, a second bottom switch connected to the second load transistor in parallel, a first top switch connected to the first shift transistor in parallel, and a second top switch connected to the second shift transistor in parallel.

18 Claims, 17 Drawing Sheets

(56)                References Cited

U.S. PATENT DOCUMENTS

| | | |
|---|---|---|
| 11,381,771 B1 | 7/2022 | Ebihara et al. |
| 11,962,440 B2 * | 4/2024 | Valaee ................. H03K 5/2481 |
| 2012/0194252 A1 | 8/2012 | Rysinski et al. |
| 2023/0188388 A1 * | 6/2023 | Valaee ............. H04L 25/03057 |
| | | 327/90 |

OTHER PUBLICATIONS

Extended European Search Report corresponding to European Application No. 24154153.1 (14 pages) (Jun. 24, 2024).

Verma et al. "An Ultra Low Energy 12-bit Rate-Resolution Scalable SAR ADC for Wireless Sensor Nodes" IEEE Journal of Solid-State Circuits 42(6):1196-1205 (Jun. 6, 2007).

Iida et al. "A 0.68e-rms Random-Noise 121dB Dynamic-Range Sub-pixel architecture CMOS Image Sensor with LED Flicker Mitigation" 2018 IEEE International Electron Devices Meeting (IEDM) (Dec. 2018).

Innocent et al. "Automotive 8.3 MP CMOS Image Sensor with 150 dB Dynamic Range and Light Flicker Mitigation" 2021 IEEE International Electron Devices Meeting (IEDM) (Dec. 2021).

* cited by examiner (a) Pixel reset (b) Reset signal(RS1) read (c) Image signal(IS1) read (d) PD transfer (e) Image signal(IS2) read (f) Reset(RS2) read

FIG.  8A

| | VAZ $(=VDD-VGS_{SHF})$ | VAZ $(=VDD-VGS_{LOAD})$ | VAZ $(=VDD-VGS_{SHF})$ $VGS_{LOAD})$ |
|---|---|---|---|
| $VGS_{SHF}>VGS_{LOAD}$ | $VAZ<VAZ_{NORM}$ | $VAZ=VAZ_{NORM}$ | $VAZ<<VAZ_{NORM}$ |
| $VGS_{SHF}<VGS_{LOAD}$ | $VAZ>VAZ_{NORM}$ | | $VAZ<VAZ_{NORM}$ |

COMPARATOR AND IMAGE SENSOR INCLUDING THE SAME

CROSS-REFERENCE TO RELATED APPLICATION

This application claims priority under 35 U.S.C. § 119 to Korean Patent Application No. 10-2023-0013598, filed on Feb. 1, 2023, in the Korean Intellectual Property Office, the disclosure of which is incorporated by reference herein in its entirety.

FIELD

The inventive concept relates to an image sensor, and more particularly, to a comparator and an image sensor including the same.

BACKGROUND

An image sensor is a device for capturing two-dimensional or three-dimensional images of an object. The image sensor generates images of an object by using a photoelectric transformation element that reacts according to the intensity of light reflected from the object. With developments in Complementary Metal-Oxide Semiconductor (CMOS) technology, a CMOS image sensor using a CMOS has been used. CMOS image sensors use a Correlated Double Sampling (CDS) technique to remove reset noise in pixels. To improve image quality, an analog-digital conversion circuit using a CDS technique may require high performance.

SUMMARY

The inventive concepts, as implemented by embodiments described herein, provide a comparator capable of adjusting an auto-zero level, and an image sensor.

According to an aspect of the inventive concept, there is provided a comparator including a gate connected to a first input node, a second input transistor including a gate connected to a second input node, a first load transistor including a drain connected to a drain of the first input transistor, a second load transistor including a drain connected to a drain of the second input transistor, a first shift transistor including a drain connected to a source of the first load transistor, a second shift transistor including a drain connected to a source of the second load transistor, a first bottom switch connected to the first load transistor in parallel, a second bottom switch connected to the second load transistor in parallel, a first top switch connected to the first shift transistor in parallel, and a second top switch connected to the second shift transistor in parallel.

According to another aspect of the inventive concept, there is provided an image sensor including a pixel array including a plurality of pixels, a ramp generator configured to generate a ramp signal, and an analog-digital conversion circuit configured to convert a pixel signal, which is output from the pixel array, into a digital signal, the analog-digital conversion circuit including a comparator and a counter, wherein the comparator includes a first input transistor including a gate configured to receive the ramp signal, a second input transistor including a gate configured to receive the pixel signal, a first load transistor connected to a source or drain of the first input transistor, a second load transistor connected to a source or drain of the second input transistor, a first shift transistor including a gate connected to the gate of the first input transistor and connected to a source or drain of the first load transistor, and a second shift transistor including a gate connected to the gate of the second input transistor and connected to a source or drain of the second load transistor. The first load transistor and the first shift transistor are configured to be selectively driven according to a first switching signal and a second switching signal, respectively, and the second load transistor and the second shift transistor are configured to be selectively driven according to the first switching signal and the second switching signal, respectively.

According to another aspect of the inventive concept, there is provided a comparator including a first input transistor including a gate connected to a first input node, a second input transistor including a gate connected to a second input node, a first load transistor including a drain connected to a drain of the first input transistor, a second load transistor including a drain connected to a drain of the second input transistor, a first shift transistor including a drain connected to a drain of the first input transistor, a second shift transistor including a drain connected to a drain of the second input transistor, a first top switch connected to the first load transistor in series, a second top switch connected to the second load transistor in series, a first bottom switch connected to the first shift transistor in series, and a second bottom switch connected to the second shift transistor in series.

BRIEF DESCRIPTION OF THE DRAWINGS

Embodiments will be more clearly understood from the following detailed description taken in conjunction with the accompanying drawings in which:

FIG. 8A is a table for explaining an auto-zero level of a comparator, according to an embodiment;

DETAILED DESCRIPTION OF EMBODIMENTS

Hereinafter, one or more embodiments are described in detail with reference to the attached drawings. The terms "first," "second," etc., may be used herein merely to distinguish one component, layer, direction, etc. from another. As used herein, when components are referred to as "directly connected," no intervening components are present. The term "connected" may be used herein to refer to a physical and/or electrical connection. The term "and/or" includes any and all combinations of one or more of the associated listed items. The terms "comprises," "comprising," "includes" and/or "including," when used herein, specify the presence of stated elements, but do not preclude the presence of additional elements.

Figure 1:
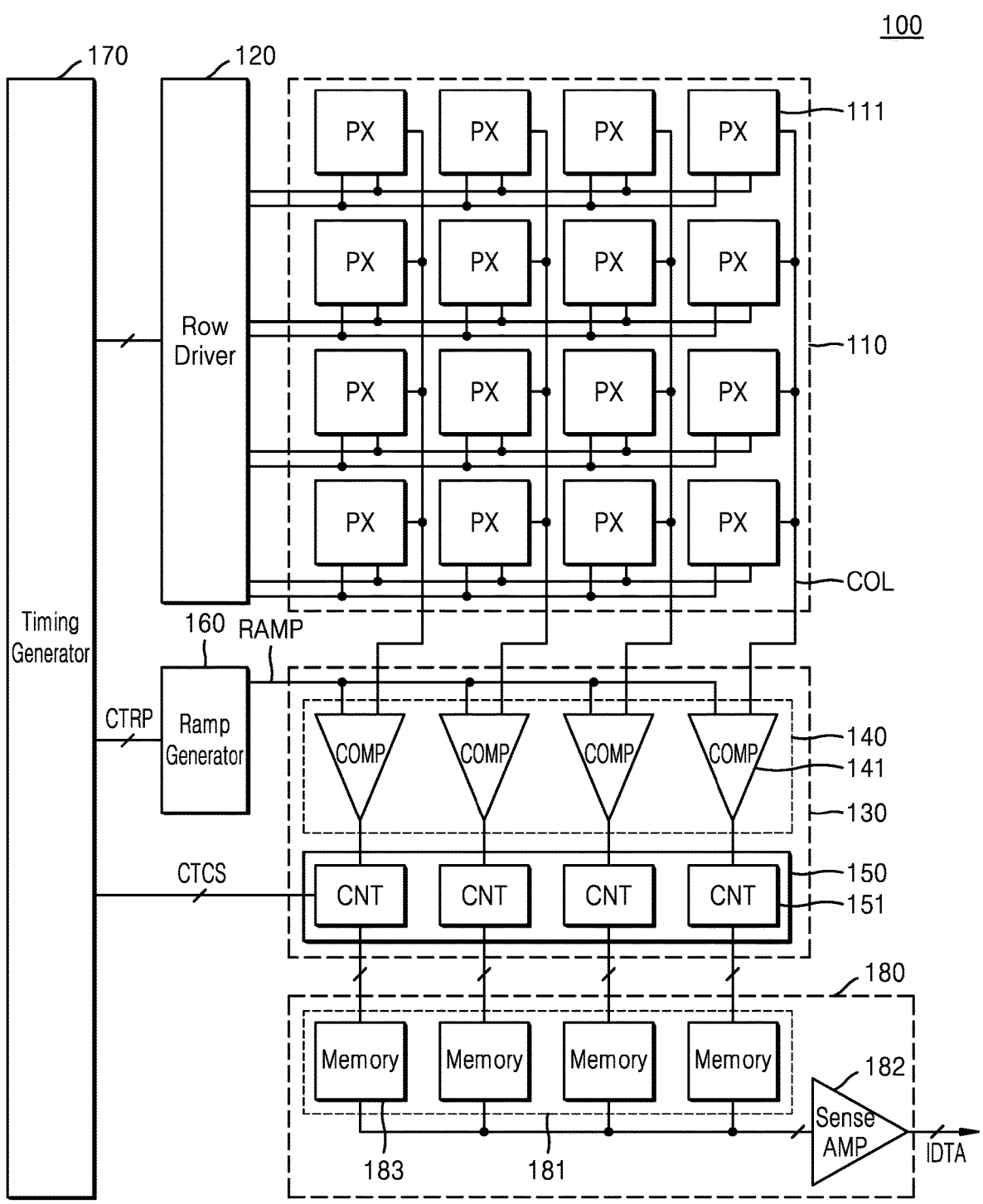
FIG. 1 is a block diagram of an image sensor according to an embodiment.

FIG. 1 is a block diagram of an image sensor 100 according to an embodiment.

The image sensor 100 may be mounted on an electronic apparatus having an image or light sensing function. For example, the image sensor 100 may be mounted on an electronic apparatus, such as a camera, a smartphone, a wearable device, an Internet of Things (IoT) device, a tablet Personal Computer (PC), a Personal Digital Assistant (PDA), a Portable Multimedia Player (PMP), or a navigation device. Also, the image sensor 100 may be mounted on an electronic apparatus included, as a component, in a vehicle, furniture, manufacturing equipment, a door, or various measuring instruments.

Referring to FIG. 1, the image sensor 100 may include a pixel array 110, a row driver 120, an analog-digital converter (hereinafter, ADC) 130, a ramp generator 160, a timing generator 170, and a buffer 180.

The pixel array 110 includes a plurality of pixels 111 respectively connected to a plurality of row lines and a plurality of column lines COL and arranged in a matrix form. Each pixel 111 includes a light sensing element. For example, the light sensing element may include a photodiode, a phototransistor, a photogate, a pinned photodiode, or the like. Each pixel 111 may include at least one light sensing element, and in an embodiment, each pixel 111 may include a plurality of light sensing elements.

The pixels 111 may sense light by using the light sensing elements and convert the sensed light into pixel signals (PXS of FIG. 2) that are electrical signals. The pixel signal PXS may include reset signals, which are generated according to reset operations of respective pixels 111, and image signals, which are generated according to light sensing operations of respective pixels 111.

Each of the pixels 111 may sense light in a specific spectral band. For example, the pixels 111 may include a red pixel converting light in a red spectral band into an electrical signal, a green pixel converting light in a green spectral band into an electrical signal, and a blue pixel converting light in a blue spectral band into an electrical signal. Color filters for transmitting light in specific spectral bands may be arranged above the pixels 111, respectively.

The timing generator 170 may output control signals or clock signals to the row driver 120, the ADC 130, and the ramp generator 160, respectively, and thus may control the operations or timings of the row driver 120, the ADC 130, and the ramp generator 160.

The row driver 120 may drive the pixel array 110 in units of rows. The row driver 120 may decode a row control signal (e.g., an address signal) generated by the timing generator 170 and may select at least any one of the row lines forming the pixel array 110 in response to the decoded row control signal. For example, the row driver 120 may generate a row selection signal. The pixel array 110 may output the pixel signal PXS from a row that is selected by the row selection signal provided from the row driver 120.

The ADC 130 may convert the pixel signal PXS, which is an analog signal that is input from the pixel array 110, into a digital signal. The ADC 130 may include a plurality of column parallel ADCs (131 of FIG. 2) that receive the pixel signals PXS from the pixel array 110 through the column lines COL. The ADC 130 may include comparison blocks 140 and counter blocks 150.

Each of the column parallel ADCs may include a comparison circuit 141 and a counter 151. FIG. 1 shows that each column parallel ADC receives one ramp signal RAMP, but one or more embodiments are not limited thereto. Each column parallel ADC may receive its corresponding ramp signal RAMP from among the ramp signals RAMP having different voltage levels. In addition, FIG. 1 shows that each column parallel ADC is connected to its corresponding column line COL, but one or more embodiments are not limited thereto. Each of the column parallel ADCs may be connected to multiple column lines COL, and the column lines COL respectively connected to the column parallel ADCs may be changed by a multiplexer.

The comparison block 140 may compare, with the ramp signal RAMP, the pixel signal PXS that is output from the pixel 111 connected to any one of the column lines COL forming the pixel array 110. The comparison block 140 may include the comparison circuits 141, and each of the comparison circuits 141 may be connected to at least one of the column lines COL corresponding to the comparison circuits 141. Each comparison circuit 141 may receive the ramp signal RAMP from the ramp generator 160.

The comparison circuit 141 may compare the pixel signal PXS with the ramp signal RAMP by receiving the pixel signal PXS from at least one of the column lines COL corresponding to the comparison circuits 141 and by receiving the ramp signal RAMP from the ramp generator 160, thus outputting a comparison result signal. The comparison circuit 141 may generate the comparison result signal, to which a Correlated Double Sampling (CDS) technique is applied, and may be referred to as a CDS circuit. The pixel signals PXS output from the pixels 111 may have a deviation resulting from the unique characteristics of each pixel 111 and/or a deviation resulting from the difference in characteristics of logics for outputting the pixel signals from the pixels 111. CDS is a technique by which a reset component (or a reset signal) and an image component (or an image signal) are obtained for each pixel signal and the difference is extracted as an effective signal component to compensate for the deviation between the pixel signals PXS. The comparison circuit 141 may output the comparison result signal to which the CDS is applied.

The comparison circuit 141 may include a first comparator (210 of FIG. 2) for comparing a pixel signal with a ramp signal and a second comparator (220 of FIG. 2) for amplifying and outputting an output of the first comparator 210. In this case, the first comparator 210 may adjust an auto-zero level, adjust the bandwidth of a comparator by adjusting the size or amount of a parasitic capacitance generated during a comparison operation, and also perform a pull-up operation in which an output node of the comparator is maintained at a constant voltage by using a switch. Switches as described herein may have at least two states (e.g., an electrically open or "off" state and an electrically closed or "on" state), and thus, may be operable to electrically connect two or more components in the "on" or closed state.

The ramp generator 160 may generate the ramp signal RAMP. The ramp generator 160 may generate the ramp signal RAMP in response to a ramp control signal CTRP provided from the timing generator 170. The ramp control signal CTRP may include a ramp enable signal, a mode signal, and the like. When the ramp enable signal is activated, the ramp generator 160 may generate a ramp signal with a gradient that is set based on the mode signal. For example, the ramp generator 160 may generate the ramp signal RAMP having a specific gradient and decreasing.

The counter block 150 may include a plurality of counters 151. The counters 151 may be respectively connected to the output nodes of the comparison circuits 141 and may perform counting based on output signals of respective comparison circuits 141. A counter control signal CTCS may include a counter clock signal, a counter reset signal controlling a reset operation of the counters 151, an inversion signal inverting internal bits of respective counters 151, and the like. The counter block 150 counts the comparison result signal according to a counter clock signal CLK and outputs the counted comparison result signal as a digital signal DS.

The counter 151 may include an up/down counter, a bit-wise inversion counter, and the like. In this case, the bit-wise inversion counter may perform similar operations to the up/down counter. For example, the bit-wise inversion counter may perform a function of performing an up count only and a function of inverting all bits in the counter when a certain signal is input and changing the bits into the 1's complement. The bit-wise inversion counter may perform a reset count and invert the same to change the reset count into the 1's complement, that is, a negative value.

However, the image sensor 100 according to an embodiment is not limited thereto. The image sensor 100 may further include a counting code generator that counts code according to the control of the timing generator 170. The counting code generator may be implemented as a gray code generator and generate, as counting code, multiple code values having a resolution according to a set number of bits. For example, the counters 151 may each include a latch circuit and an operational circuit, and the latch circuit may receive the counting code from the counting code generator and an output signal from the comparison block 140 and may latch a code value of the counting code at a point in time in which a level of a comparison signal is transited. The operational circuit may compute a reset value and an image signal value and generate an image signal value from which a reset level of the pixel 111 is removed. The counter block 150 may output, as a pixel value, the image signal value from which the reset level is removed.

The buffer 180 may temporarily store a digital signal that is output from the ADC 130 and then may sense, amplify, and output the digital signal. The buffer 180 may include a column memory block 181 and a sense amplifier 182, and the column memory block 181 may include a plurality of memories 183. The memories 183 may temporarily store digital signals, which are respectively output from the counters 151, and output the digital signals to the sense amplifier 182, and the sense amplifier 182 may sense and amplify the digital signals that are output from the memories 183. The sense amplifier 182 may output the amplified digital signals as image data IDTA.

Figure 2:
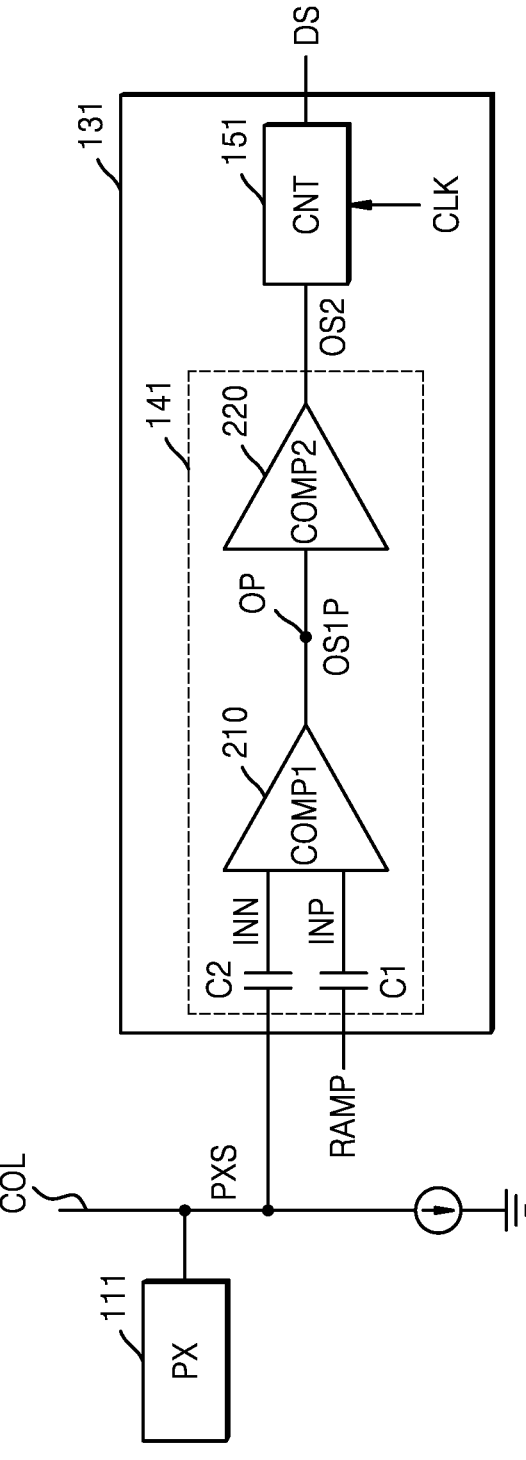
FIG. 2 is a block diagram of an ADC connected to a pixel included in an image sensor, according to an embodiment.

FIG. 2 is a block diagram of an ADC 131 connected to a pixel included in an image sensor, according to an embodiment. The ADC 131 of FIG. 2 may be a column parallel ADC.

Referring to FIG. 2, the column parallel ADC 131 may include the comparison circuit 141 and the counter 151. For convenience of explanation, FIG. 2 shows one comparison circuit 141 and one counter 151 included in the column parallel ADC 131 connected to one column line COL, but as described with reference to FIG. 1, the ADC 130 may include column parallel ADCs 131 and comparison circuits 141 and counters 151 connected to the column lines COL.

The comparison circuit 141 may include a first comparator 210, a second comparator 220, and capacitors C1 and C2. The first comparator 210 may include a differential amplifier, and the differential amplifier may be implemented as an Operational Transconductance Amplifier (OTA), an operational amplifier, or the like.

A ramp signal RAMP may be transmitted to a first input node of the first comparator 210 as a first input signal INP, and a pixel signal PXS may be transmitted to a second input node of the first comparator 210 as a second input signal INN. The first comparator 210 may compare the pixel signal PXS and the ramp signal RAMP, which are transmitted through the capacitors C1 and C2, with each other and may output a comparison result as an output signal OSIP through a first output node OP.

The second comparator 220 may amplify or invert the output signal OSIP that is output from the first comparator 210. For example, the second comparator 220 may be implemented as an amplifier and may include, for example, a differential amplifier, an inverter, or the like. An output signal OS2 that is output from the second comparator 220 may be provided to the counter 151 as a comparison result signal.

The comparison circuit 141 may be initialized in response to auto-zero signals in a first auto-zero period and a second auto-zero period before the comparison operation is performed. For example, the auto-zero signals may include a first auto-zero signal (AZ1 of FIG. 5 or 6), which is input to the first comparator 210, and a second auto-zero signal (AZ2 of FIG. 10), which is input to the second comparator 220. Auto-zero levels of the first input node and the second input node may differ, wherein the first input node and the second input node are initialized in the first auto-zero period and the second auto-zero period, respectively. For example, the auto-zero level in the second auto-zero period may be lower than that in the first auto-zero period.

The counter 151 may count the comparison result signal, that is, the output signal OS2 of the second comparator 220, based on a counting clock signal CLK and thus may output a digital signal DS. The counter 151 may transmit the digital signal DS to the buffer (180 of FIG. 1).

Figure 3:
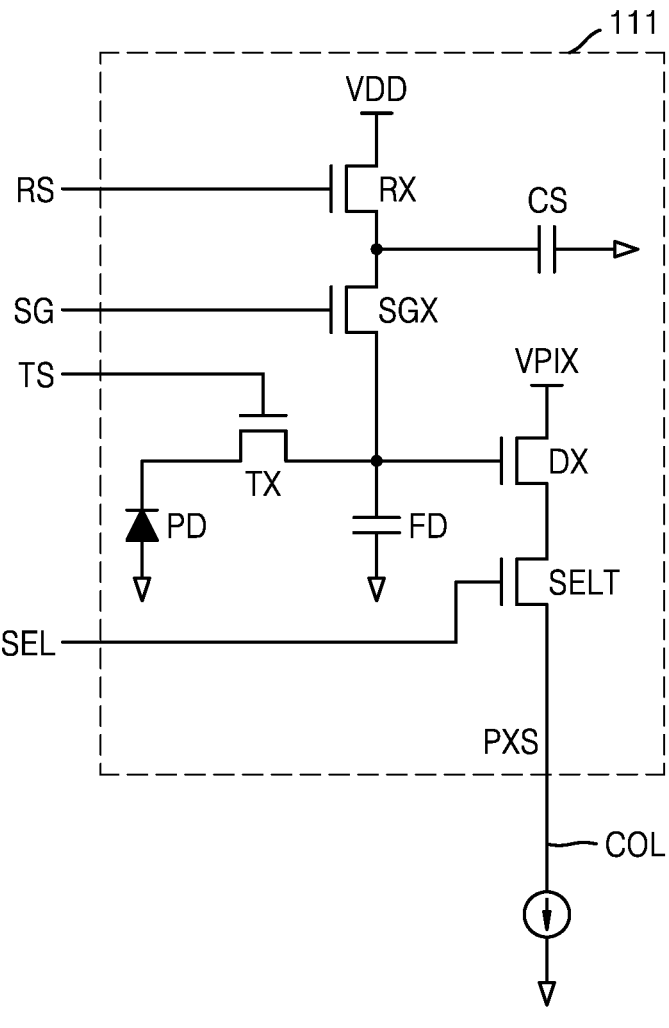
FIG. 3 is a circuit diagram of an example of a pixel according to an embodiment.
Figure 4:
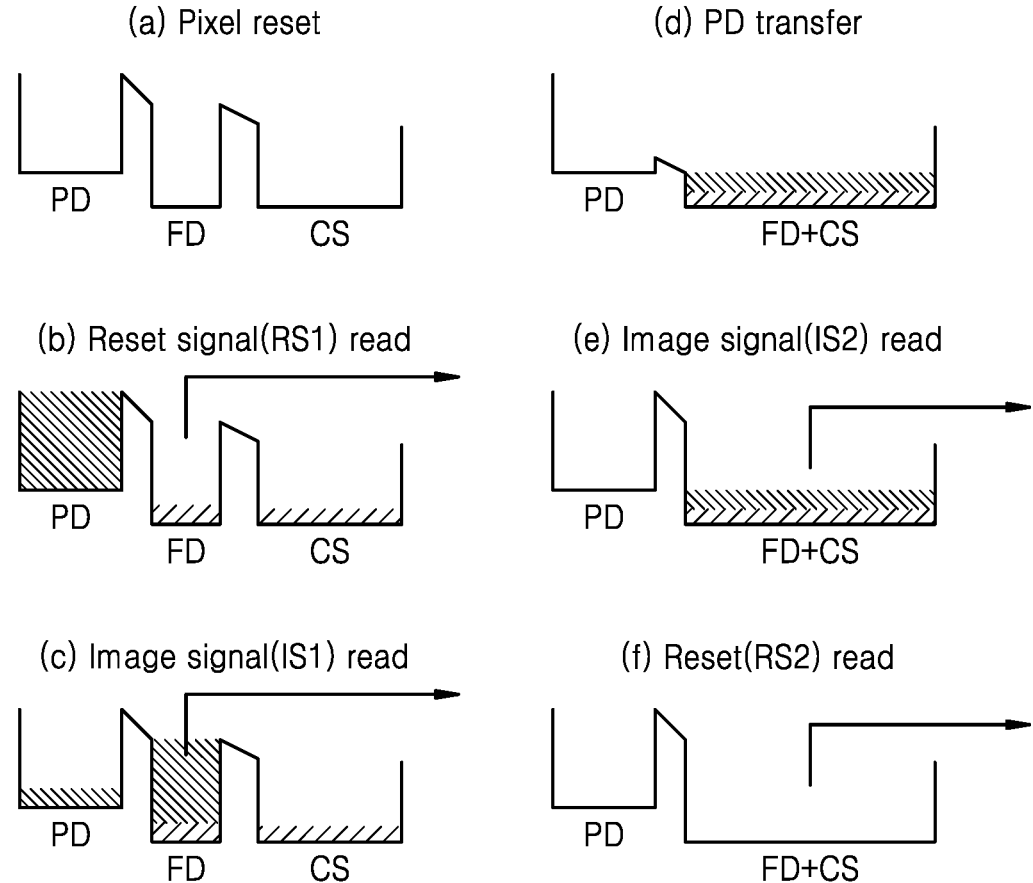
FIG. 4 is a diagram for explaining an operation of a pixel, according to an embodiment.

FIG. 3 is a circuit diagram of an example of a pixel 111 according to an embodiment. FIG. 4 is a diagram for explaining an operation of the pixel 111 according to an embodiment.

Referring to FIG. 3, the pixel 111 may include a photodiode PD, a transmission transistor TX, a floating diffusion node FD, a reset transistor RX, a drive transistor DX, and a selection transistor SELT. Also, the pixel 111 may include a storage control transistor SGX and a capacitor CS.

The photodiode PD may generate photocharges that vary depending on the intensity of incident light. The photodiode PD is an example of a photoelectric transformation element and may be at least one of a phototransistor, a photogate, a pinned photodiode (PPD), and a combination thereof, and may be replaced with another photoelectric transformation element.

The transmission transistor TX may transmit the photocharges to the floating diffusion node FD according to a transmission control signal TS that is output from the row driver (120 of FIG. 1). The transmission transistor TX may be turned on (or "driven") in response to the transmission control signal TS applied to a gate of the transmission transistor TX and may transmit charges, which are generated by the photodiode PD, to the floating diffusion node FD, and the charges may be accumulated in the floating diffusion node FD. That is, a parasitic capacitor may be formed in the floating diffusion node FD.

According to a potential according to the photocharges accumulated in the floating diffusion node FD, the drive transistor DX may amplify the photocharges and transmit the amplified photocharges to the selection transistor SELT. A drain of the selection transistor SELT may be connected to a source of the drive transistor DX, and according to a selection signal SEL that is output from the row driver 120, the pixel signal PXS may be output to the column line COL connected to the pixel 111.

The reset transistor RX may reset the floating diffusion node FD (e.g., reset the floating diffusion node FD to the level of a power voltage VPIX) according to a rest control signal RS provided from the row driver 120. Also, the reset transistor RX may reset the capacitor CS (e.g., reset the capacitor CS to the level of the power voltage VPIX) according to the reset control signal RS. The reset transistor RX may be turned on in response to the reset control signal RS applied to a gate of the reset transistor RX and may reset the floating diffusion node FD or the capacitor CS based on the power voltage VPIX. For example, as the storage control transistor SGX may be turned on together with the reset transistor RX in response to a storage control signal SG transmitted to a gate of the storage control transistor SGX, the power voltage VPIX may be applied to the floating diffusion node FD, and thus, the floating diffusion node FD may be reset.

Overflowed charges among the photocharges generated by the photodiodes PD may be stored in the capacitor CS, and the capacitor CS may be an overflow capacitor. The capacitor CS may be referred to as a Lateral Overflow Integration Capacitor (LOFIC). The capacitance of the capacitor CS may be greater than that of the floating diffusion node FD. The storage control transistor SGX may transmit the photocharges, which are accumulated in the floating diffusion node FD, to the capacitor CS according to the storage control signal SG.

FIG. 3 shows a structure in which the pixel 111 includes one photodiode PD, the transistors TX, RX, DX, SELT, and SGX, and the capacitor CS, but the structure of each pixel 111 included in the image sensor according to an embodiment is not limited thereto. The pixel 111 may include three transistors selected from among the transmission transistor TX, the reset transistor RX, the drive transistor DX, and the selection transistor SELT, and a connection relationship between the storage control transistor SGX and the capacitor CS may be different from that shown in FIG. 3.

Referring to (a) of FIG. 4, the pixel 111 may be reset. That is, all of the photodiode PD, the floating diffusion node FD, and the capacitor CS may be reset, and thus, the accumulated charges may be removed.

After the pixel 111 is reset, photocharges may be generated by the photodiode PD as light is provided to the pixel 111, and in a high irradiance environment, the photocharges generated by the photodiode PD may overflow and move to the floating diffusion node FD and the capacitor CS. As shown in (b) of FIG. 4, the pixel signal PXS according to a voltage level of the floating diffusion node FD at this point in time may be read (that is, output) as a first reset signal RS1.

After the first reset signal RS1 is output, the photocharges accumulated in the photodiode PD may be moved to the floating diffusion node FD. As shown in (c) of FIG. 4, the pixel signal PXS according to a voltage level, which corresponds to the amount of charges stored in the floating diffusion node FD, at this point in time may be read (that is, output) as a first image signal IS1.

As shown in (d) of FIG. 4, after the first image signal IS1 is output, all of the photocharges accumulated in the photodiode PD may be transferred to the floating diffusion node FD and the capacitor CS. As shown in (e) of FIG. 4, the pixel signal PXS according to a voltage level, which corresponds to the amount of charges stored in the floating diffusion node FD and the capacitor CS, at this point in time may be read (that is, output) as a second image signal IS2.

As shown in (f) of FIG. 4, after the second image signal IS2 is output, the floating diffusion node FD and the capacitor CS may be reset, and the pixel signal PXS according to the resetting of the floating diffusion node FD and the capacitor CS may be read (that is, output) as a second reset signal RS2.

Figure 5:
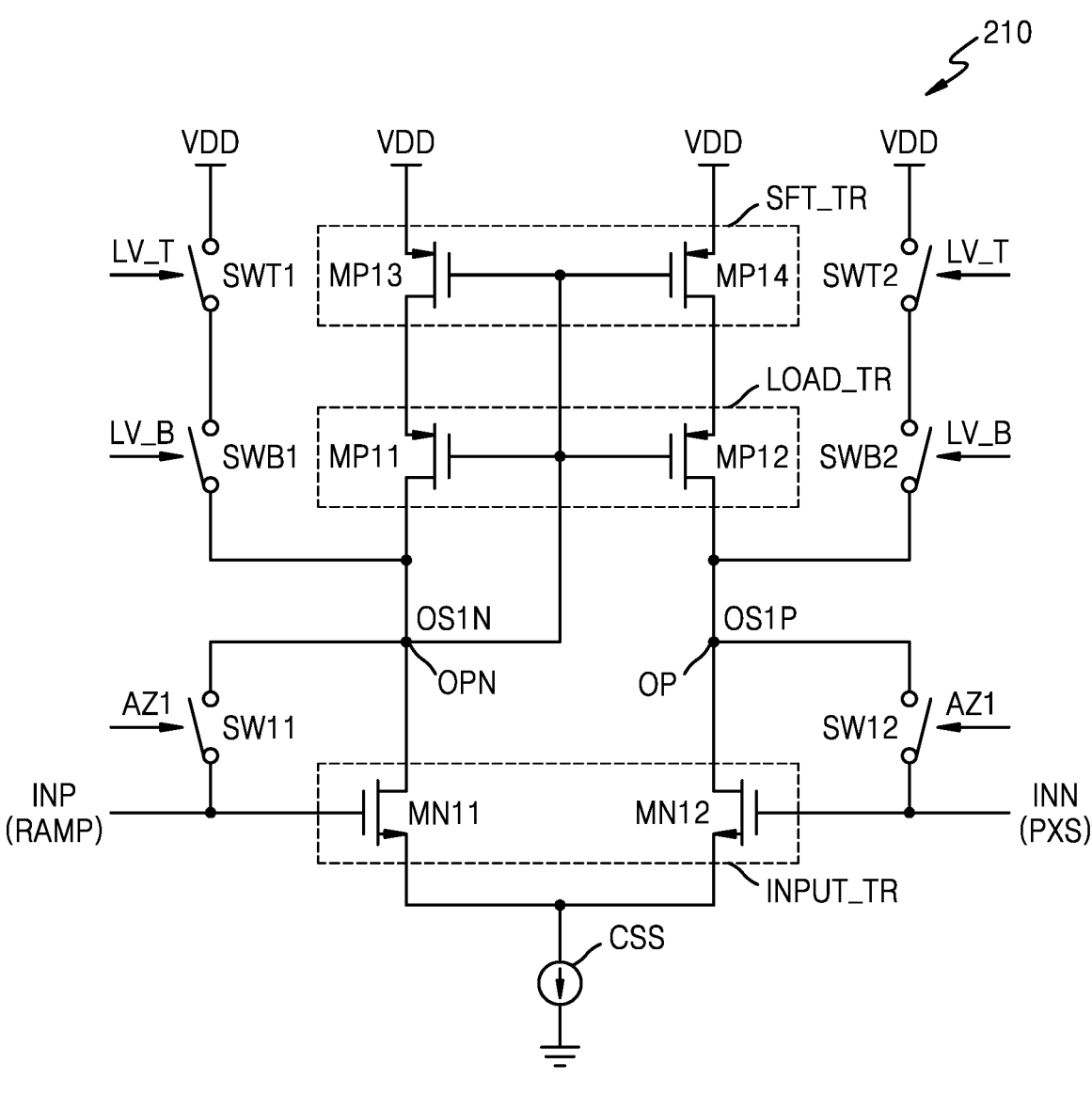
FIG. 5 is an example of a circuit diagram of a comparator according to an embodiment.

FIG. 5 is an example of a circuit diagram of the first comparator 210 according to an embodiment. The first comparator 210 of FIG. 5 may be the first comparator 210 of FIG. 2, and the first output signal OSIP shown in FIG. 5 may be the output signal OSIP of FIG. 2.

Referring to FIG. 5, the first comparator 210 may include a plurality of transistors MP11, MP12, MP13, MP14, MN11, and MN12, a plurality of switching circuits SW11, SW12, SWT1, SWT2, SWB1, and SWB2, and a current source CSS. The first comparator 210 may include the first P-type transistor MP11, the second P-type transistor MP12, the third P-type transistor MP13, the fourth P-type transistor MP14, the first N-type transistor MN11, and the second N-type transistor MN12. For example, the current source CSS may be realized as an N-type transistor, that is, an N-type Metal Oxide Semiconductor Field Effect Transistor (MOSFET). An end of the current source CSS may be connected to a ground voltage and generate a bias current.

A gate of the first N-type transistor MN11 and a gate of the second N-type transistor MN12 may receive differential inputs, for example, a first input signal INP and a second input signal INN, respectively, and the first N-type transistor MN11 and the second N-type transistor MN12 may generate a differential current according to the difference in levels of the first input signal INP and the second input signal INN. For example, the ramp signal RAMP may be received as the first input signal INP, and the pixel signal PXS may be received as the second input signal INN.

An end (e.g., a source) of the first N-type transistor MN11 may be connected to the current source CSS, and the other end (e.g., a drain) thereof may be connected to a second output node OPN. An end (e.g., a source) of the second N-type transistor MN12 may be connected to the current source CSS, and the other end (e.g., a drain) thereof may be connected to a first output node OP. The first N-type transistor MN11 and the second N-type transistor MN12 may each be referred to as an input transistor INPUT_TR. The first N-type transistor MN11 may be referred to as a first input transistor, and the second N-type transistor MN12 may be referred to as a second input transistor.

When the first input signal INP is the same as the second input signal INN, the same current may flow in the first N-type transistor MN11 and the second N-type transistor MN12, and when the first input signal INP is different from the second input signal INN, different currents may flow in the first N-type transistor MN11 and the second N-type transistor MN12. The sum of the amount of currents flowing in the first N-type transistor MN11 and the second N-type transistor MN12 may be equal to the bias current of the current source CSS.

An end (e.g., a source) of the first P-type transistor MP11 may be connected to an end (e.g., a drain) of the third P-type transistor MP13, and the other end (e.g., a drain) of the first P-type transistor MP11 may be connected to an output node that outputs the second output signal OSIN. An end (e.g., a source) of the second P-type transistor MP12 may be connected to an end (e.g., a drain) of the fourth P-type transistor MP14, and the other end (e.g., a drain) of the second P-type transistor MP12 may be connected to an output node OP that outputs the first output signal OSIP. The first P-type transistor MP11 and the second P-type transistor MP12 may each be referred to as a load transistor LOAD_TR. The first P-type transistor MP11 may be referred to as a first load transistor, and the second P-type transistor MP12 may be referred to as a second load transistor.

A power voltage VDD may be applied to an end (e.g., a source) of the third P-type transistor MP13, and the other end (e.g., the drain) of the third P-type transistor MP13 may be connected to the end (e.g., the source) of the first P-type transistor MP11. The power voltage VDD may be applied to an end (e.g., a source) of the fourth P-type transistor MP14, and the other end (e.g., a drain) of the fourth P-type transistor MP14 may be connected to the end (e.g., the source) of the second P-type transistor MP12. The third P-type transistor MP13 and the fourth P-type transistor MP14 may each be referred to as a shift transistor SFT_TR. The third P-type transistor MP13 may be referred to as a first shift transistor, and the fourth P-type transistor MP14 may be referred to as a second shift transistor.

The first output signal OSIP and the second output signal OSIN may be determined according to current mirroring of the first P-type transistor MP11 and the second P-type transistor MP12 or current mirroring of the third P-type transistor MP13 and the fourth P-type transistor MP14. The first output signal OSIP and the second output signal OSIN may be determined based on the amount of currents flowing in the first N-type transistor MN11 and the second N-type transistor MN12. When the level of the first input signal INP is higher than that of the second input signal INN, a relatively greater amount of currents may flow in the first N-type transistor MN11 than in the second N-type transistor MN12; thus, the level of the first output signal OSIP may increase, and the level of the second output signal OSIN may decrease.

In an embodiment, a threshold voltage of the first P-type transistor MP11 may be lower than that of the third P-type transistor MP13, and a threshold voltage of the second P-type transistor MP12 may be lower than that of the fourth P-type transistor MP14.

A first bottom switch SWB1 may be connected to the first P-type transistor MP11 in parallel, and a second bottom switch SWB2 may be connected to the second P-type transistor MP12 in parallel. Turning on/off of the first bottom switch SWB1 and the second bottom switch SWB2 may be controlled according to a first switching signal LV_B. Therefore, when the first bottom switch SWB1 and the second bottom switch SWB2 are turned on (i.e., switched to an electrically closed state) according to the first switching signal LV_B, the first P-type transistor MP11 and the second P-type transistor MP12 may not be driven (i.e., the transistors MP11 and MP12 may be bypassed), and when the first bottom switch SWB1 and the second bottom switch SWB2 are turned off (i.e., switched to an electrically open state) according to the first switching signal LV_B, the first P-type transistor MP11 and the second P-type transistor MP12 may be driven. The first switching signal LV_B may be received from the timing generator (170 of FIG. 1).

A first top switch SWT1 may be connected to the third P-type transistor MP13 in parallel, and a second top switch SWT2 may be connected to the fourth P-type transistor MP14 in parallel. Turning on/off of the first top switch SWT1 and the second top switch SWT2 may be controlled according to a second switching signal LV_T. Therefore, when the first top switch SWT1 and the second top switch SWT2 are turned on according to the second switching signal LV_T, the third P-type transistor MP13 and the fourth P-type transistor MP14 may not be driven (i.e., the transistors MP13 and MP14 may be bypassed), and when the first top switch SWT1 and the second top switch SWT2 are turned off according to the second switching signal LV_T, the third P-type transistor MP13 and the fourth P-type transistor MP14 may be driven. The second switching signal LV_T may be received from the timing generator 170.

A first auto-zero switch SW11 may connect the first input node, that is, the gate of the first N-type transistor MN11, to the second output node OPN, that is, the drain of the first N-type transistor MN11. A second auto-zero switch SW12 may connect the second input node, that is, the gate of the second N-type transistor MN12, to the first output node OP, that is, the drain of the second N-type transistor MN12. When the first auto-zero switch SW11 and the second auto-zero switch SW12 are turned on in response to a first auto-zero signal AZ1, the second input node, to which the second input signal INN is input, may be connected to the first output node OP, from which the first output signal OSIP is output, and an input terminal, to which the first input signal INP is input, may be connected to the second output node OPN, from which the second output signal OSIN is output.

For example, in the first auto-zero period and the second auto-zero period, the first auto-zero signal AZ1 for turning on the first auto-zero switch SW11 and the second auto-zero switch SW12 may be received. The first auto-zero signal AZ1 may be received from the timing generator 170. When the first auto-zero switch SW11 and the second auto-zero switch SW12 are turned on, voltage levels of the first input signal INP, the second input signal INN, the first output signal OSIP, and the second output signal OSIN may become equal.

In this case, the voltage level of each of the signals INP, INN, OSIP, and OSIN in the first auto-zero period may be referred to as a first auto-zero voltage, and the voltage level of each of the signals INP, INN, OSIP, and OSIN in the second auto-zero period may be referred to as a second auto-zero voltage. On the contrary, for example, in a first comparison period and a second comparison period in which the first comparator 210 performs a comparison operation, the first auto-zero switch SW11 and the second auto-zero switch SW12 may be turned off.

Figure 6:
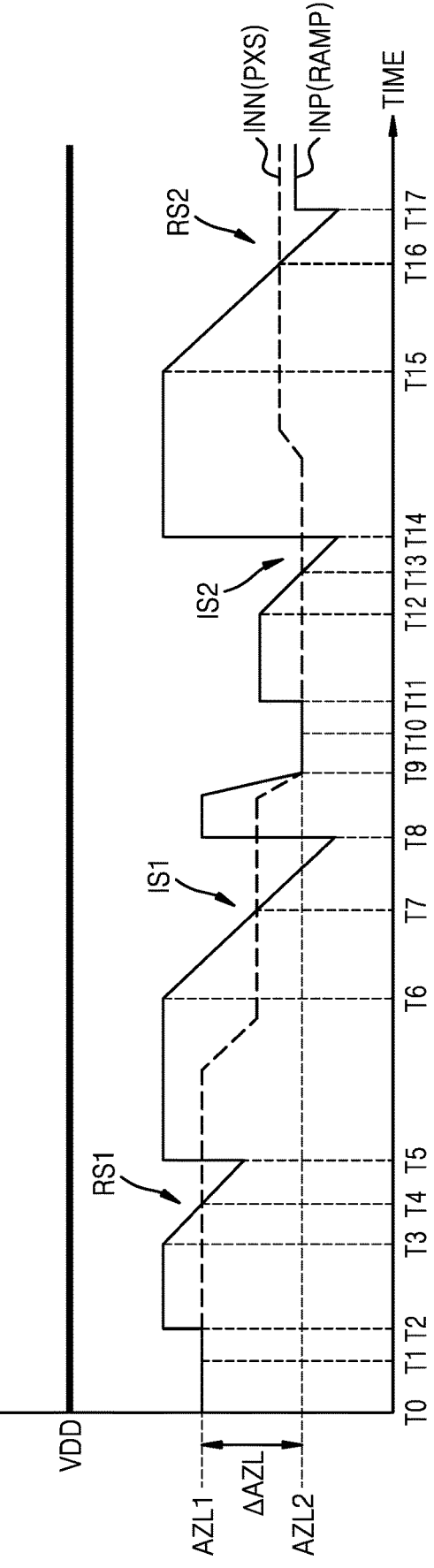
FIG. 6 is a timing diagram of signals that are input to a comparator, according to an embodiment.
Figure 7A:
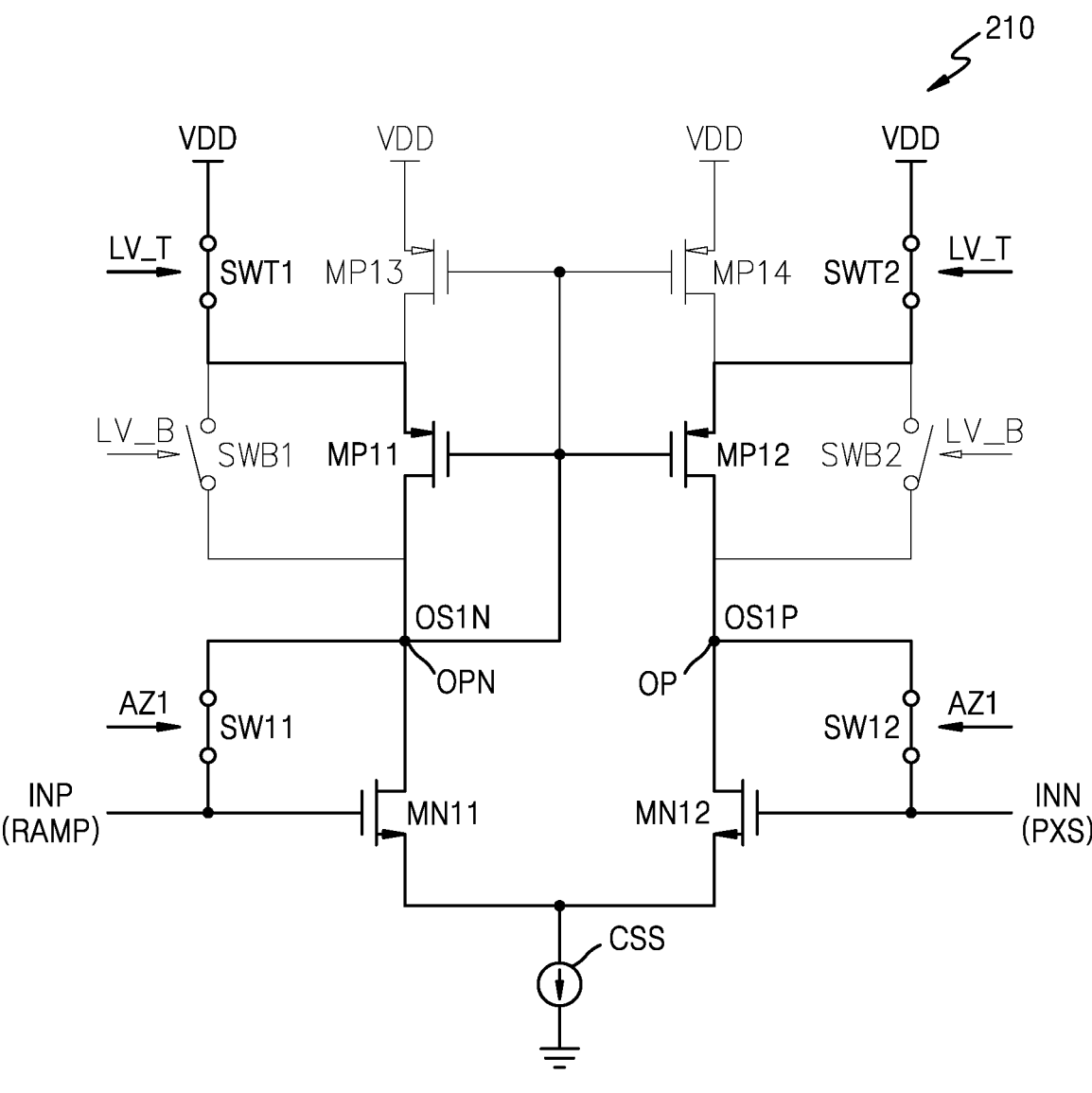
FIGS. 7A, 7B, and 7C are circuit diagrams for explaining an operation of a comparator, according to an embodiment.
Figure 7B:
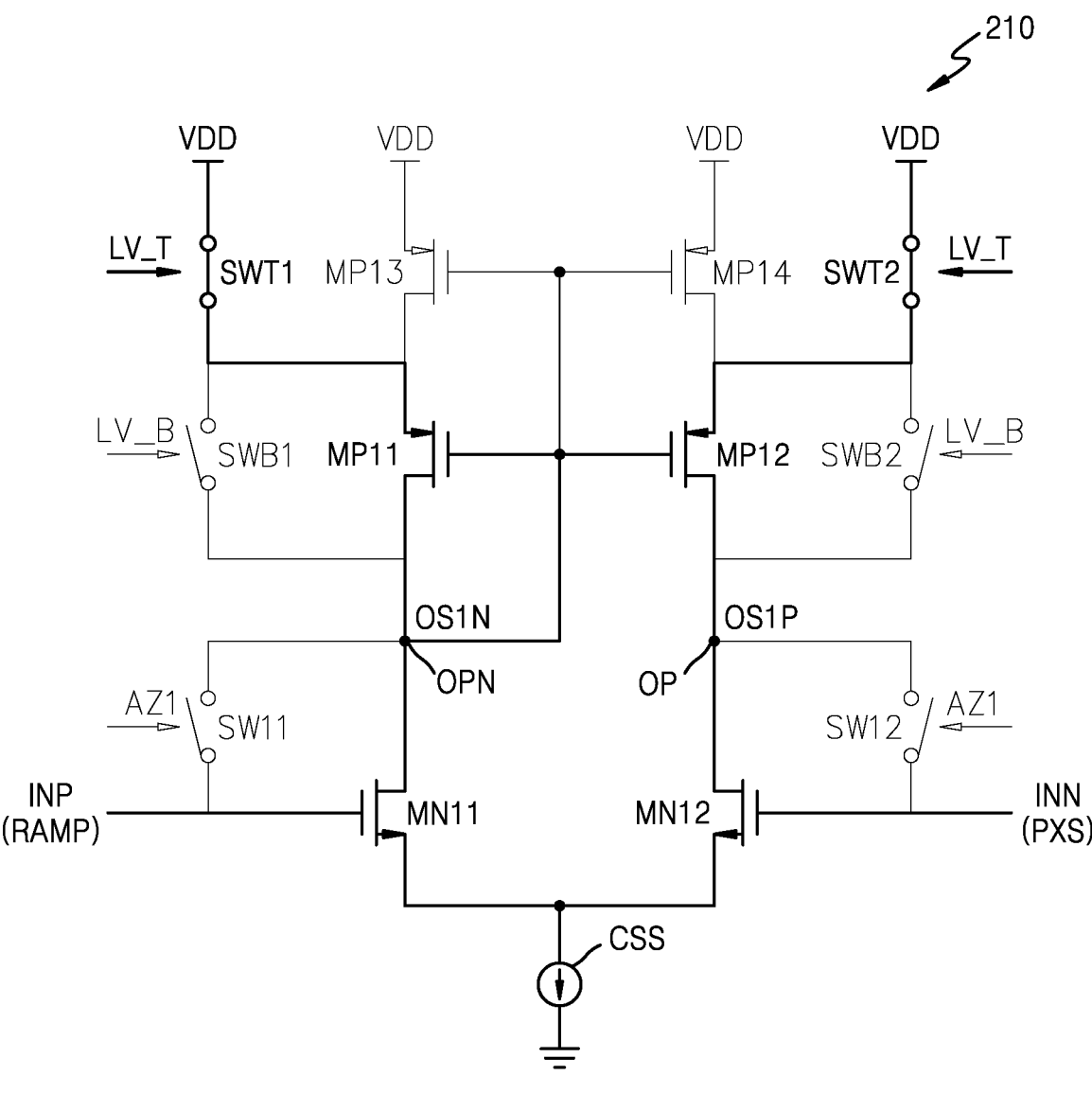
Figure 7C:
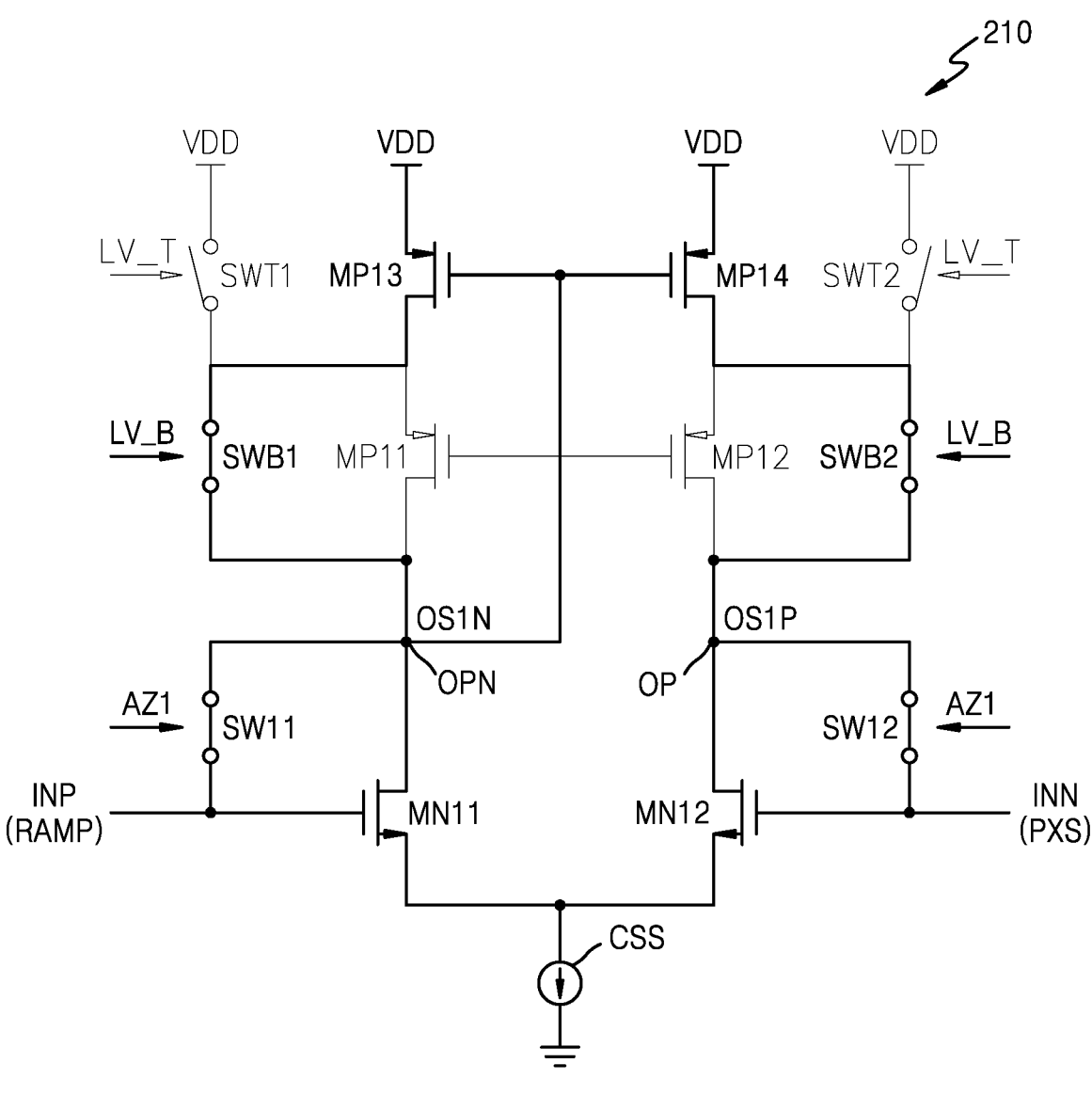

FIG. 6 is a timing diagram of signals that are input to the first comparator 210, according to an embodiment. FIGS. 7A to 7C are circuit diagrams for explaining an operation of the first comparator 210, according to an embodiment.

Referring to FIGS. 4, 6, and 7A, a period from time T0 to time T1 may be defined as the first auto-zero period, and auto-zero signals, e.g., the first auto-zero signal AZ1 and a second auto-zero signal (AZ2 of FIG. 10), may be activated from the time T0 to the time T1. In response to the first auto-zero signal AZ1, the first auto-zero switch SW11 and the second auto-zero switch SW12 may be turned on, and the voltage levels of input nodes and the output nodes OP and OPN of the first comparator 210 may be equal to a first auto-zero level AZL1.

In the first auto-zero period, the first top switch SWT1 and the second top switch SWT2 may also be turned on, and the second bottom switch SWB1 and the second bottom switch SWB2 may be turned off. Therefore, the first P-type transistor MP11 and the second P-type transistor MP12 may be driven, whereas the third P-type transistor MP13 and the fourth P-type transistor MP14 may not be driven. The first auto-zero level AZL1 may be a value obtained by subtracting, from the power voltage VDD, a gate-source voltage VGS of the first P-type transistor MP11 and a value obtained by subtracting, from the power voltage VDD, a gate-source voltage of the second P-type transistor MP12.

Referring to FIGS. 4, 6, and 7B, a period from the time T1 to time T8 may be defined as a first comparison period. In the first comparison period, the first auto-zero signal AZ1 and the second auto-zero signal AZ2 may be deactivated, and the first auto-zero switch SW11 and the second auto-zero switch SW12 may be turned off. In addition, in the first comparison period, the first top switch SWT1 and the second top switch SWT2 may be turned on, and the first bottom switch SWB1 and the second bottom switch SWB2 may be turned off.

For digital conversion of the first reset signal RS1, an offset may be applied to the ramp signal RAMP at the time T2, and then, the ramp signal RAMP may decrease from the time T3 to the time T5. The counter (151 of FIG. 2) may count the counting clock signal (CLK of FIG. 2) from the time T3 to the time T4, in which the polarity of the output signal OS2 of the second comparator (220 of FIG. 2) changes.

When the digital conversion of the first reset signal RS1 is completed, an offset may be applied again to the ramp signal RAMP at the time T5 to convert the first image signal IS1 into a digital signal. As the transmission transistor (TX of FIG. 3) is turned on and the charges accumulated in the photodiode PD are moved to the floating diffusion node FD after the time T5, the second input signal INN may be changed.

The ramp signal RAMP may decrease from the time T6 to the time T8 to digitally convert the first image signal IS1. The counter (151 of FIG. 2) may count the counting clock signal CLK from the time T6 to the time T7, in which the polarity of the output signal OS2 of the second comparator (220 of FIG. 2) changes. An offset may be applied again to the ramp signal RAMP at the time T8 to perform a next operation.

After the time T8, as the transmission transistor TX and the storage control transistor (SGX of FIG. 3) are turned on and the charges accumulated in the photodiode PD are moved to the floating diffusion node FD and the capacitor CS, the second input signal INN may be changed.

Referring to FIGS. 4, 6, and 7C, a period from time T9 to time T10 may be defined as a second auto-zero period. In the second auto-zero period, the first auto-zero signal AZ1 and the second auto-zero signal AZ2 may be activated, and the first auto-zero switch SW11 and the second auto-zero switch SW12 may be turned on. The voltage levels of the input nodes and the output nodes OP and OPN of the first comparator 210 may become equal to a second auto-zero level AZL2.

In the second auto-zero period, the first bottom switch SWB1 and the second bottom switch SWB2 may be turned on, and the second top switch SWT1 and the second top switch SWT2 may be turned off. Therefore, the third P-type transistor MP13 and the fourth P-type transistor MP14 may be driven, whereas the first P-type transistor MP11 and the second P-type transistor MP12 may not be driven. The second auto-zero level AZL2 may have a value obtained by subtracting, from the power voltage VDD, a gate-source voltage of the third P-type transistor MP13 and a value obtained by subtracting, from the power voltage VDD, a gate-source voltage of the fourth P-type transistor MP14.

In an embodiment, the threshold voltage of the first P-type transistor MP11 may be lower than that of the third P-type transistor MP13, and the threshold voltage of the second P-type transistor MP12 may be lower than that of the fourth P-type transistor MP14. Therefore, the second auto-zero level AZL2 may be lower than the first auto-zero level AZL1 by a certain level ΔAZL.

Figure 8B:
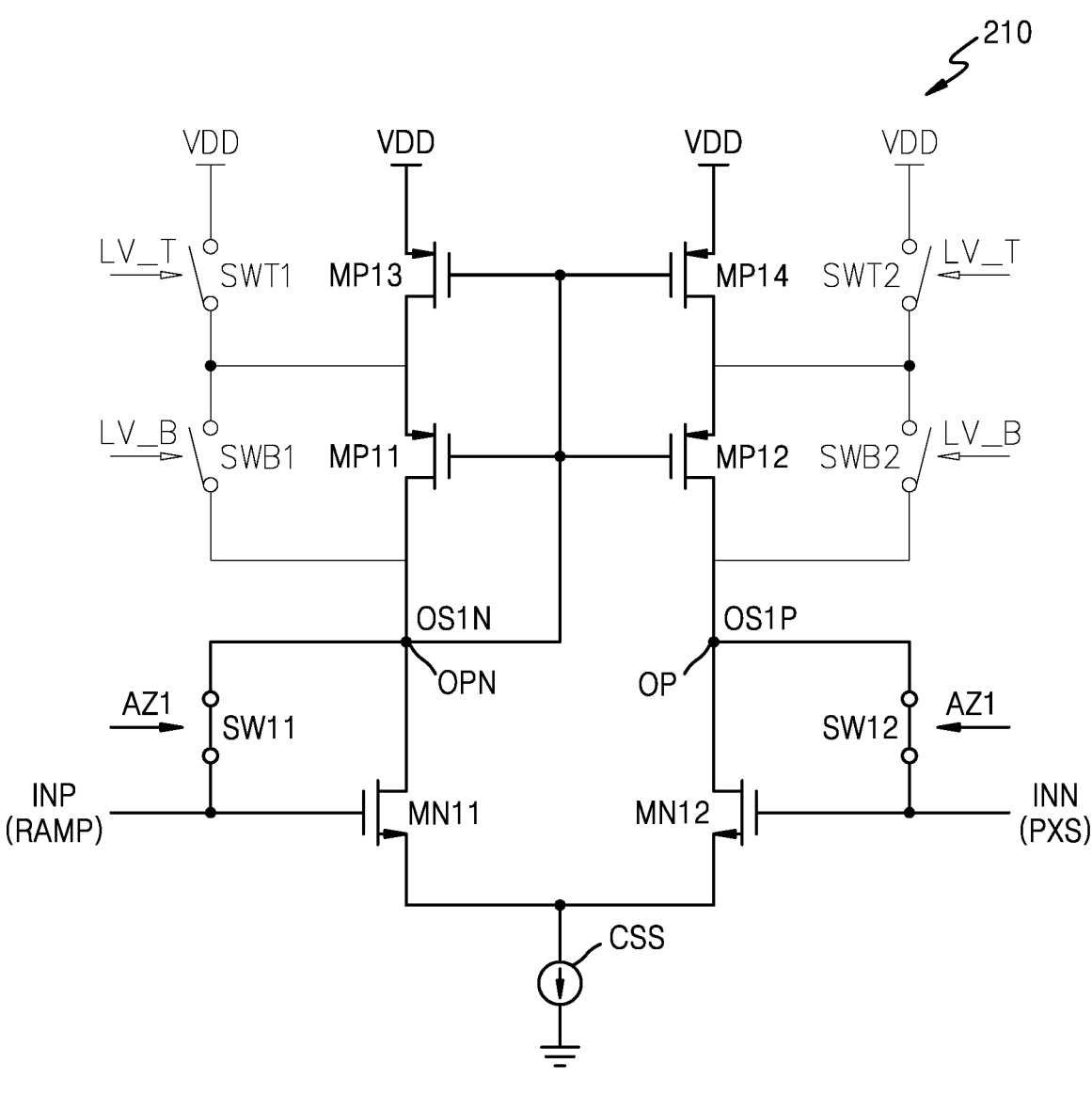
FIG. 8B is a circuit diagram for explaining an operation of a comparator, according to an embodiment.

In contrast to the illustration of FIG. 7C, however, as shown in FIG. 8B, the first bottom switch SWB1, the second bottom switch SWB2, the first top switch SWT1, and the second top switch SWT2 may be turned off, and the first P-type transistor MP11 to the fourth P-type transistor MP14 may be driven, in the second auto-zero period. In this case, the second auto-zero level AZL2 may be lowered.

Referring back to FIGS. 4, 6, and 7B, a period from time T10 to time T17 may be defined as a second comparison period. In the second comparison period, the first auto-zero signal AZ1 and the second auto-zero signal AZ2 may be deactivated, and the first auto-zero switch SW11 and the second auto-zero switch SW12 may be turned off. Also, in the second comparison period, the first top switch SWT1 and the second top switch SWT2 may be turned on, and the first bottom switch SWB1 and the second bottom switch SWB2 may be turned off.

For digital conversion of the second image signal IS2, an offset may be applied to the ramp signal RAMP at the time T11, and then, the ramp signal RAMP may decrease from the time T12 to the time T14. The counter (151 of FIG. 2) may count the counting clock signal CLK from the time T12 to the time T13, in which the polarity of the output signal OS2 of the second comparator 220 changes.

When the digital conversion of the second image signal IS2 is completed, an offset may be applied again to the ramp signal RAMP at the time T14 to convert the second reset signal RS2 into a digital signal. As the floating diffusion node FD and the capacitor CS are reset after the time T14, the second input signal INN may change.

The ramp signal RAMP may decrease from the time T15 to the time T17 to digitally convert the second reset signal RS2. The counter 151 may count the counting clock signal CLK from the time T15 to the time T16, in which the polarity of the output signal OS2 of the second comparator 220 changes. An offset may be applied again to the ramp signal RAMP at the time T17 to perform a next operation.

The pixel 111 of the image sensor according to an embodiment may generate the pixel signal PXS in the stated order of the first reset signal RS1, the first image signal IS1, the second image signal IS2, and the second reset signal RS2. Therefore, the image sensor may adjust the second auto-zero level AZL2 in a second auto-zero period to be lower than the first auto-zero level AZL1 in a first auto-zero period to ensure that the ramp signal RAMP does not exceed the power voltage VDD, the ramp signal RAMP being used to convert the second reset signal RS2.

The first comparator 210 may not separate the drain of the first N-type transistor MN11, which is the input transistor, from the second output node OPN, and the drain of the second N-type transistor MN12 from the first output node OP. That is, the respective terminals (e.g., a source or drain) of the input transistors MN11 and MN12 may be directly connected to the output nodes OPN and OP, respectively. The first comparator 210 may adjust the auto-zero level by selectively driving the shift transistors (the third P-type transistor MP13 and the fourth P-type transistor MP14) or the load transistors (the first P-type transistor MP11 and the second P-type transistor MP12) in the first auto-zero period and the second auto-zero period. Therefore, as additional transistors are driven (e.g., using additional switches as described herein), the size of the parasitic capacitance may be controlled or prevented from increasing, and the bandwidth of the comparator may be adjusted or may increase.

FIG. 8A is a table for explaining an auto-zero level of the first comparator 210, according to an embodiment. FIG. 8B is a circuit diagram for explaining an operation of the first comparator 210, according to an embodiment.

Referring to FIGS. 5 and 8A, the first comparator 210 may adjust an auto-zero level VAZ. The auto-zero level VAZ when the load transistor LOAD_TR is only driven among the load transistor LOAD_TR and the shift transistor SFT_TR may be defined as a reference level $VAZ_{NORM}$. $VAZ_{NORM}$ may be a value obtained by subtracting a gate-source voltage $VGS_{LOAD}$ of the load transistor LOAD_TR from the power voltage VDD.

When a gate-source voltage $VGS_{SHF}$ of the shift transistor SFT_TR is higher than the gate-source voltage $VGS_{LOAD}$ of the load transistor LOAD_TR, and when the shift transistor SFT_TR is only driven among the load transistor LOAD_TR and the shift transistor SFT_TR (e.g., as described with reference to FIG. 7A or 7C), the auto-zero level VAZ may be a value obtained by subtracting the gate-source voltage $VGS_{SHF}$ of the shift transistor SFT_TR from the power voltage VDD and may be lower than the reference auto-zero level $VAZ_{NORM}$. AS described with reference to FIG. 6, for example, the reference auto-zero level $VAZ_{NORM}$ may be the first auto-zero level AZL1, and the auto-zero level VAZ when the shift transistor SFT_TR is only driven among the load transistor LOAD_TR and the shift transistor SFT_TR may be the second auto-zero level AZL2.

On the contrary, the gate-source voltage $VGS_{SHF}$ of the shift transistor SFT_TR is lower than the gate-source voltage $VGS_{LOAD}$ of the load transistor LOAD_TR, and when the shift transistor SFT_TR is only driven among the load transistor LOAD_TR and the shift transistor SFT_TR (e.g., as described with reference to FIG. 7A or 7C), the auto-zero level VAZ may be a value obtained by subtracting the gate-source voltage $VGS_{SHF}$ of the shift transistor SFT_TR from the power voltage VDD and may be higher than the reference auto-zero level $VAZ_{NORM}$. Therefore, the auto-zero level VAZ may be variously adjusted by adjusting the characteristics of the shift transistor SFT_TR and the load transistor LOAD_TR included in the first comparator 210.

Referring to FIGS. 8A and 8B, in the second auto-zero period, both the load transistor LOAD_TR and the shift transistor SFT_TR may be driven. That is, all of the first P-type transistor MP11 to the fourth P-type transistor MP14 may be driven, and all of the first top switch SWT1, the second top switch SWT2, the first bottom switch SWB1, and the second bottom switch SWB2 may be turned off. The first auto-zero switch SW11 and the second auto-zero switch SW12 may be turned on.

When both the load transistor LOAD_TR and the shift transistor SFT_TR are driven, the auto-zero level VAZ may be a value obtained by subtracting, from the power voltage VDD, the gate-source voltage $VGS_{SHF}$ of the shift transistor SFT_TR and the gate-source voltage $VGS_{LOAD}$ of the load transistor LOAD_TR and may be lower than the reference auto-zero level $VAZ_{NORM}$. Therefore, when there is a need to lower the auto-zero level VAZ in comparison with the example described with reference to FIG. 7C, both the load transistor LOAD_TR and the shift transistor SFT_TR may be driven.

Figure 9A:
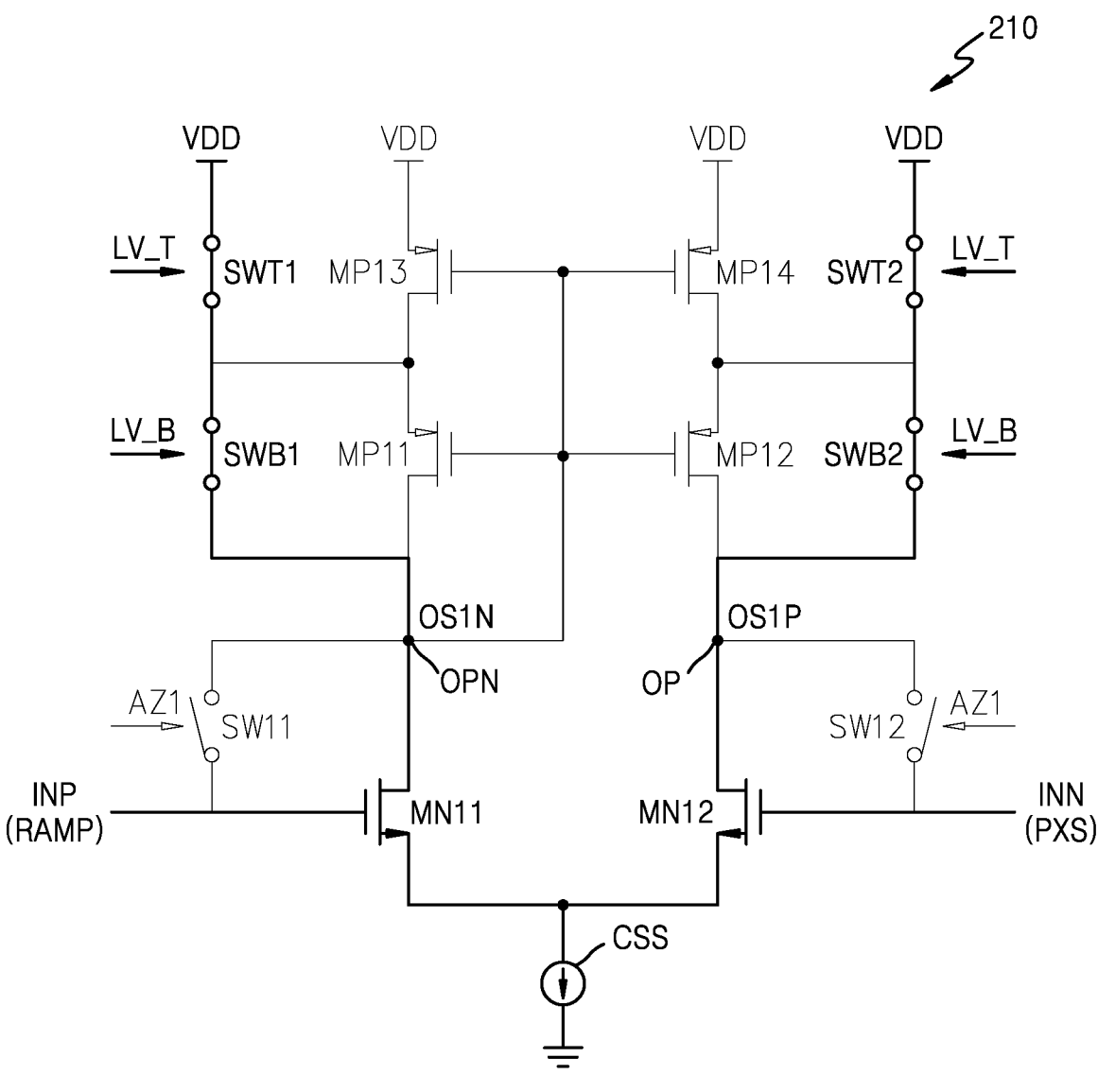
FIGS. 9A and 9B are circuit diagrams for explaining an operation of a comparator, according to an embodiment.
Figure 9B:
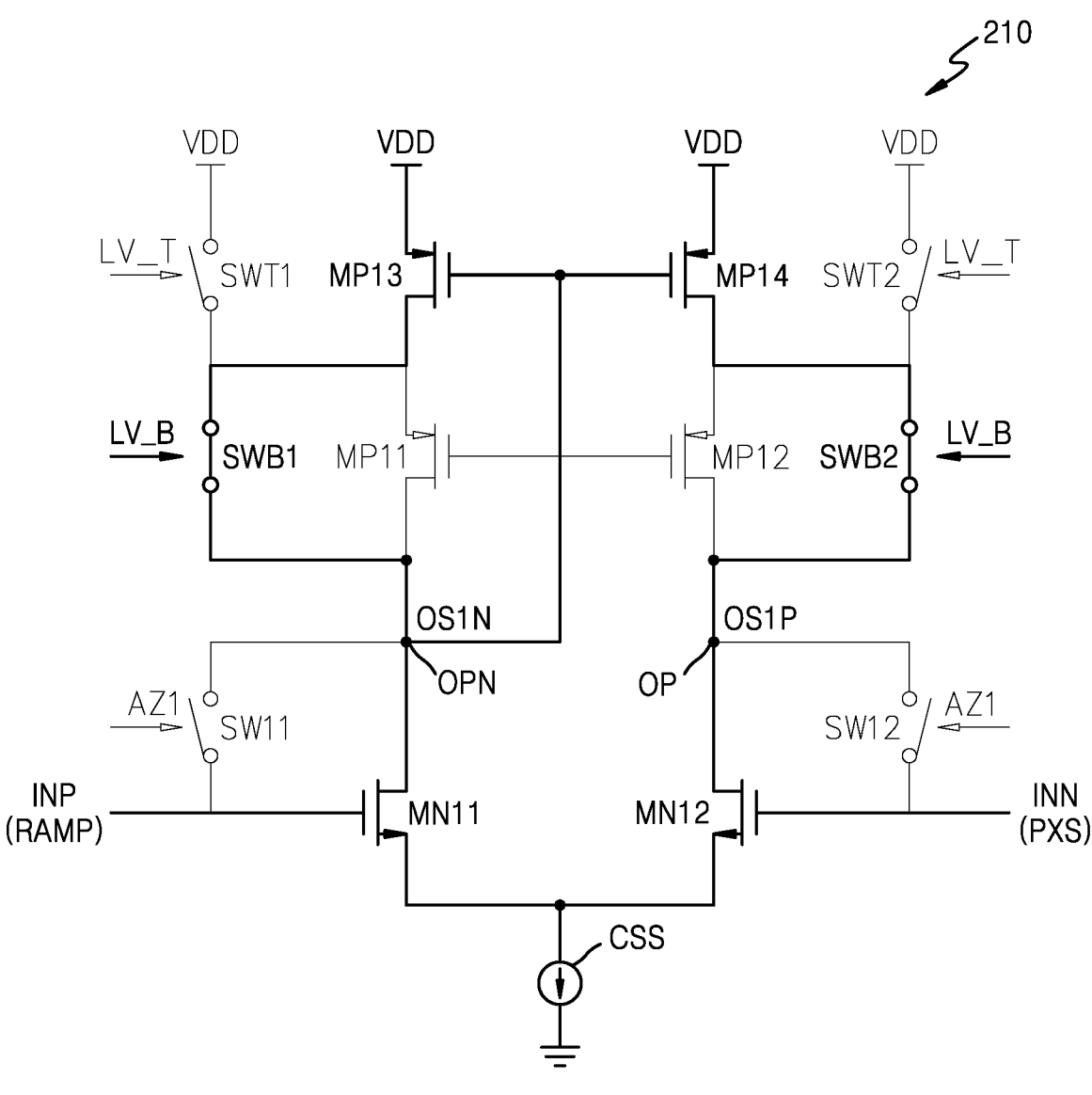

FIGS. 9A and 9B are circuit diagrams for explaining an operation of the first comparator 210, according to an embodiment.

Referring to FIG. 9A, the first comparator 210 may perform a pull-up operation in which the first output node OP and the second output node OPN are stably maintained at a constant voltage. During the pull-up operation, the first output node OP and the second output node OPN may be maintained at the power voltage VDD or the ground voltage. For example, during the pull-up operation, all of the first top switch SWT1, the second top switch SWT2, the first bottom switch SWB1, and the second bottom switch SWB2 may be turned on, and the power voltage VDD may be applied to the first output node OP and the second output node OPN.

In an embodiment, the pull-up operation may be performed in periods except for the first auto-zero period, the first comparison period, the second auto-zero period, and the second comparison period. For example, the pull-up operation may be performed when the first comparator 210 does not perform a comparison operation. That is, when only some of the comparison circuits 141 perform the comparison operation, the other comparison circuits 141 may perform the pull-up operation. Alternatively, in an embodiment, the pull-up operation may be performed when the gradient of the ramp signal RAMP is 0.

Referring to FIG. 9B, in the first comparison period and the second comparison period which are described with reference to FIG. 6, the shift transistor may be driven instead of the load transistor. As described above with reference to FIG. 7B, when the first P-type transistor MP11 and the second P-type transistor MP12, both of which are load transistors, are driven, only the parasitic capacitance of the first bottom switch SWB1 and the second bottom switch SWB2 may affect the first output node OP and the second output node OPN. On the contrary, in the first comparison period and the second comparison period, when the third P-type transistor MP13 and the fourth P-type transistor MP14 that are shift transistors are driven instead of the load transistors, the parasitic capacitance of the first top switch SWT1, the second top switch SWT2, the first bottom switch SWB1, and the second bottom switch SWB2 may affect the first output node OP and the second output node OPN. That is, the parasitic capacitance of the first comparator 210 may relatively increase, and thus, the bandwidth of the first comparator 210 may relatively decrease, and the operation speed of the first comparator 210 may be reduced. When the pixel signal PXS has a lot of noise, the influence of the noise on the operation of the first comparator 210 may be reduced by deliberately lowering the bandwidth of the first comparator 210.

Figure 10:
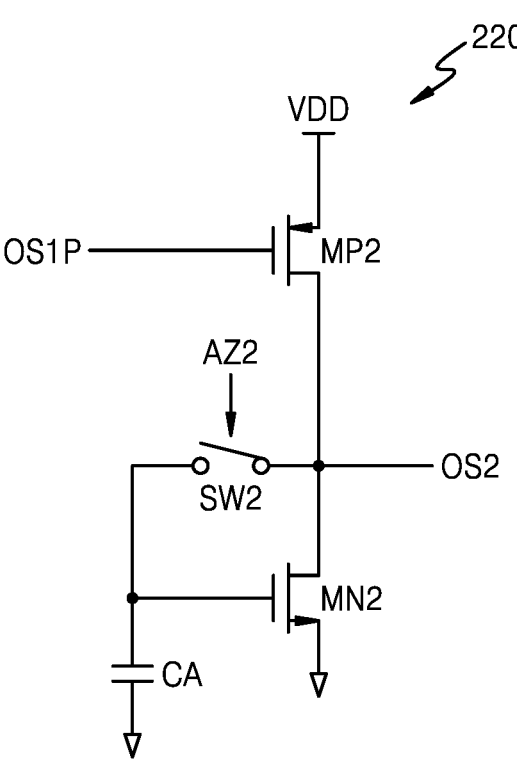
FIG. 10 is an example of a circuit diagram of a second comparator included in an ADC, according to an embodiment.

FIG. 10 is a circuit diagram of an example of the second comparator 220 included in an ADC, according to an embodiment. The first output signal OSIP (which is provided as an input in FIG. 10) may be the output signal OSIP of FIG. 2.

Referring to FIG. 10, the second comparator 220 may include a plurality of transistors MP2 and MN2, an auto-zero switch SW2, and a capacitor CA. A gate of a P-type transistor MP2 of the second comparator 220 may be connected to the first output node OP of the first comparator 210, and the first output signal OSIP of the first comparator 210 may be input as an input signal of the second comparator 220. The power voltage VDD may be applied to a source of the P-type transistor MP2, and a drain of the P-type transistor MP2 may be connected to an output node from which the output signal OS2 of the second comparator 220 is output.

A drain of an N-type transistor MN2 may be connected to the output node of the second comparator 220, and a ground voltage may be applied to a source of the N-type transistor MN2. That is, the P-type transistor MP2 and the N-type transistor MN2 may be connected to each other in series. The N-type transistor MN2 may function as a current source and generate a bias current based on a voltage of one node of the capacitor CA.

Figure 11:
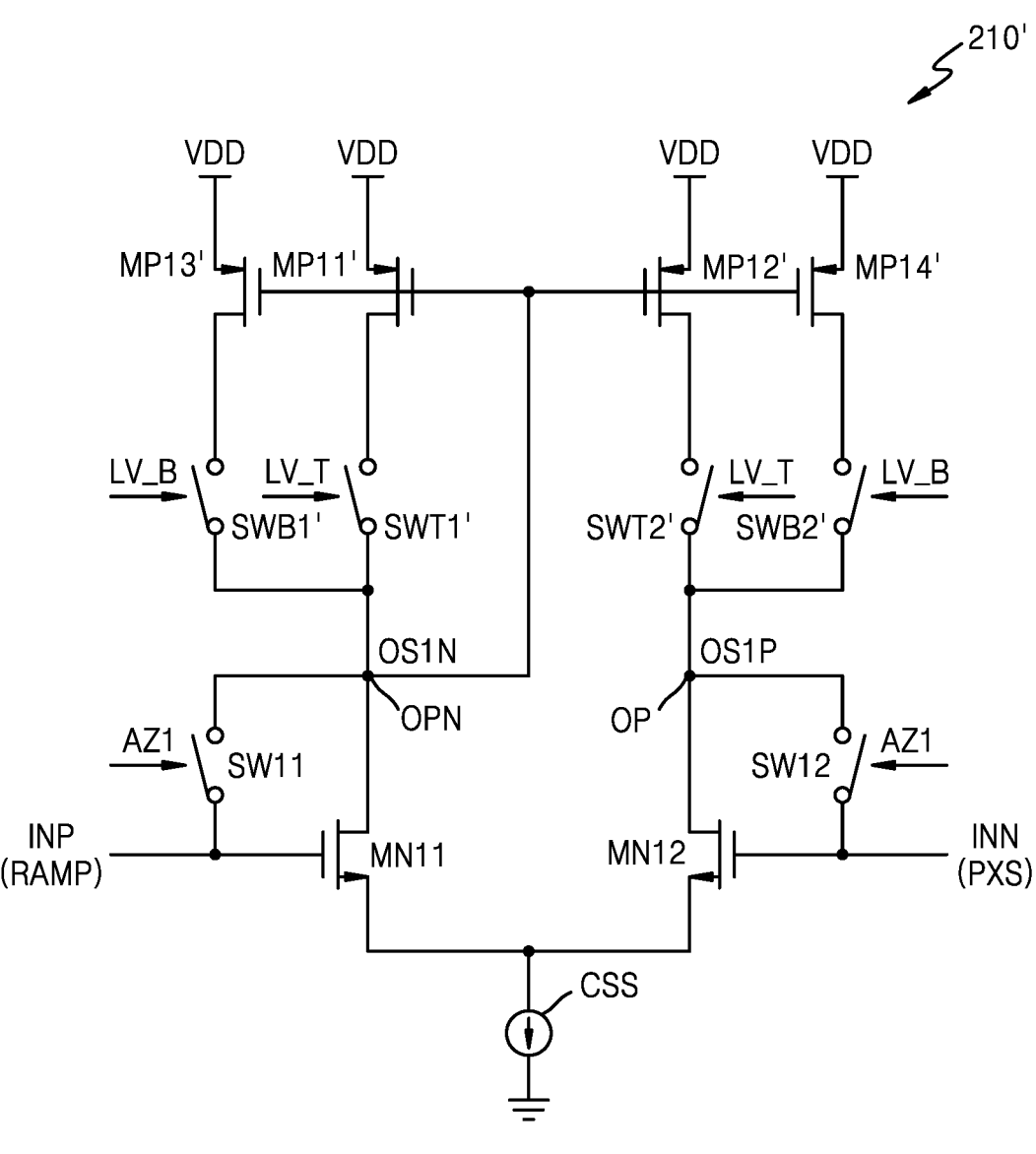
FIGS. 11 and 12 are examples of circuit diagrams of comparators according to an embodiment.
Figure 12:
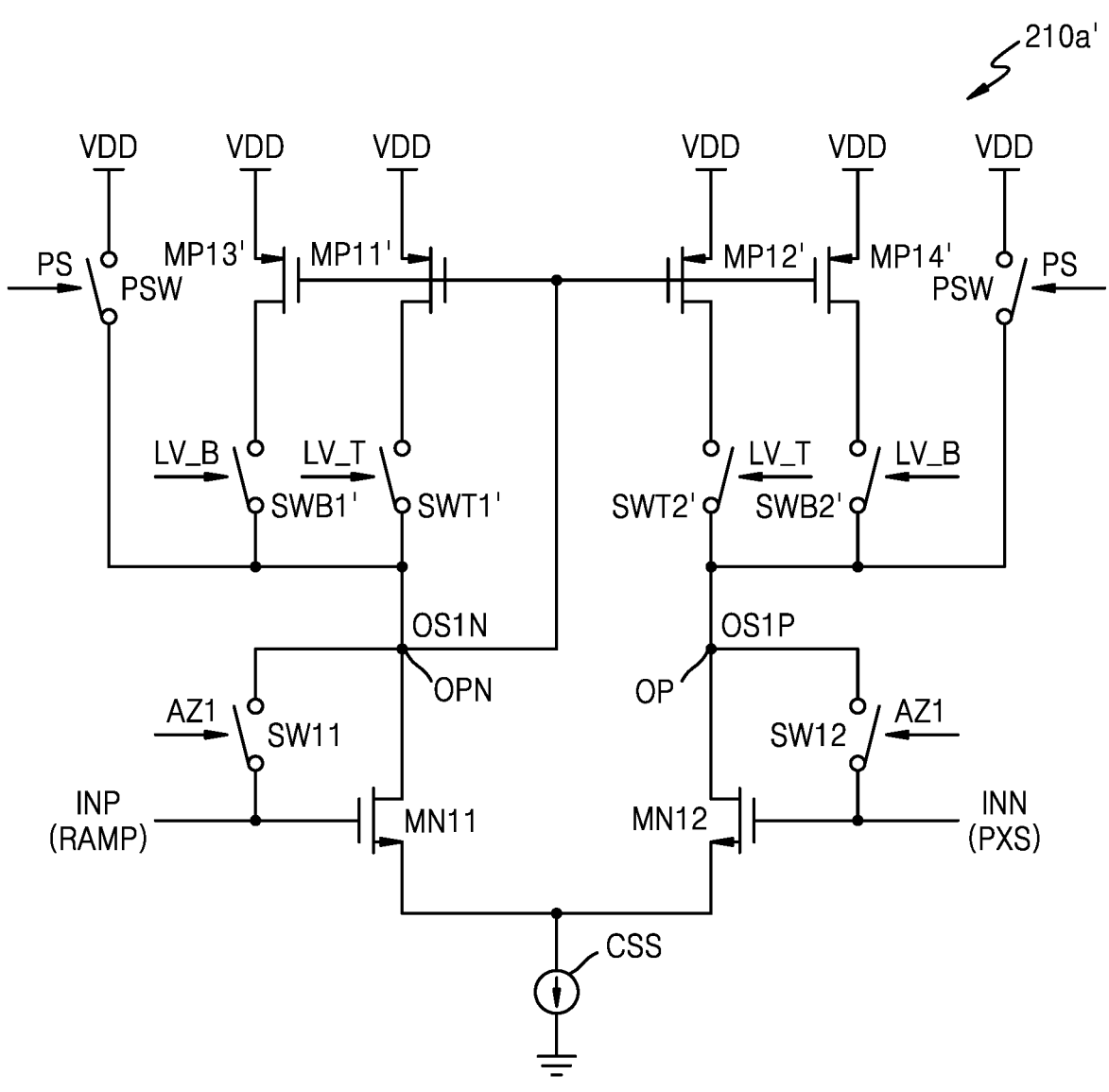

FIGS. 11 and 12 are examples of circuit diagrams of first comparators 210' and 210a' according to an embodiment. The first comparator 210' of FIG. 11 and the first comparator 210a' of FIG. 12 may each be the first comparator 210 of FIG. 2, and output signals OSIP of FIGS. 11 and 12 may each be the output signal OSIP of FIG. 2. Descriptions regarding components that are the same as those of FIG. 5 are omitted in FIGS. 11 and 12.

Referring to FIG. 11, the first comparator 210' may include a plurality of transistors MP11', MP12', MP13', MP14', MN11, and MN12, a plurality of switching circuits SW11, SW12, SWT1', SWT2', SWB1', and SWB2', and a current source CSS. The first comparator 210' may include the first P-type transistor MP11', the second P-type transistor MP12', the third P-type transistor MP13', the fourth P-type transistor MP14', the first N-type transistor MN11, and the second N-type transistor MN12.

The power voltage VDD may be applied to an end (e.g., a source) of the first P-type transistor MP11', and the other end (e.g., a drain) of the first P-type transistor MP11' may be connected to the first top switch SWT1'. When the first top switch SWT1' is turned on, the other end (e.g., the drain) of the first P-type transistor MP11' may be connected to an output node from which the second output signal OSIN is output, and the first P-type transistor MP11' may be driven. The first P-type transistor MP11' may be connected to the first top switch SWT1' in series, but a connection order of the first P-type transistor MP11' and the first top switch SWT1' may change relative to the configuration shown in FIG. 11.

The power voltage VDD may be applied to an end (e.g., a source) of the second P-type transistor MP12', and the other end (e.g., a drain) of the second P-type transistor MP12' may be connected to the second top switch SWT2'. When the second top switch SWT2' is turned on, the other end (e.g., the drain) of the second P-type transistor MP12' may be connected to an output node OP from which the first output signal OSIP is output, and the second P-type transistor MP12' may be driven.

Each of the first P-type transistor MP11' and the second P-type transistor MP12' may be referred to as a load transistor. In an embodiment, in the first auto-zero period, the first comparison period, and the second comparison period, the first P-type transistor MP11' and the second P-type transistor MP12' that are the load transistors may be driven.

The power voltage VDD may be applied to an end (e.g., a source) of the third P-type transistor MP13', and the other end (e.g., a drain) of the third P-type transistor MP13' may be connected to the first bottom switch SWB1'. When the first bottom switch SWB1' is turned on, the other end (e.g., the drain) of the third P-type transistor MP13' may be connected to the output node from which the second output signal OSIN is output, and the third P-type transistor MP13' may be driven. The third P-type transistor MP13' may be connected to the first bottom switch SWB1' in series, but a connection order of the third P-type transistor MP13' and the first bottom switch SWB1' may change relative to the configuration shown in FIG. 11.

The power voltage VDD may be applied to an end (e.g., a source) of the fourth P-type transistor MP14', and the other end (e.g., a drain) of the fourth P-type transistor MP14' may be connected to the second bottom switch SWB2'. When the second bottom switch SWB2' is turned on, the other end (e.g., the drain) of the fourth P-type transistor MP14' may be connected to the output node OP from which the first output signal OSIP is output, and the fourth P-type transistor MP14' may be driven.

Each of the third P-type transistor MP13' and the fourth P-type transistor MP14' may be referred to as a shift transistor. In an embodiment, in the second auto-zero period, the third P-type transistor MP13' and the fourth P-type transistor MP14' that are the shift transistors may be driven. In an embodiment, a threshold voltage of the first P-type transistor MP11' may be lower than that of the third P-type transistor MP13', and a threshold voltage of the second P-type transistor MP12' may be lower than that of the fourth P-type transistor MP14'. Therefore, the second auto-zero level in the second auto-zero period may be lower than the first auto-zero level in the first auto-zero period.

Referring to FIG. 12, compared to the first comparator 210' of FIG. 11, the first comparator 210a' may include pull-up switches PSW configured to apply the power voltage VDD to the first output node OP and the second output node OPN. When a pull-up switching signal PS is activated, the pull-up switches PSW may perform a pull-up operation in which the power voltage VDD is applied to the first output node OP and the second output node OPN.

In an embodiment, the pull-up operation may be performed in periods other than or except for the first auto-zero period, the first comparison period, the second auto-zero period, and the second comparison period. For example, the pull-up operation may be performed when the first comparator 210a' does not perform a comparison operation. That is, when only some of the comparison circuits 141 perform the comparison operation, the other comparison circuits 141 may perform the pull-up operation. Alternatively, in an embodiment, the pull-up operation may be performed when the gradient of the ramp signal RAMP is 0.

Figure 13:
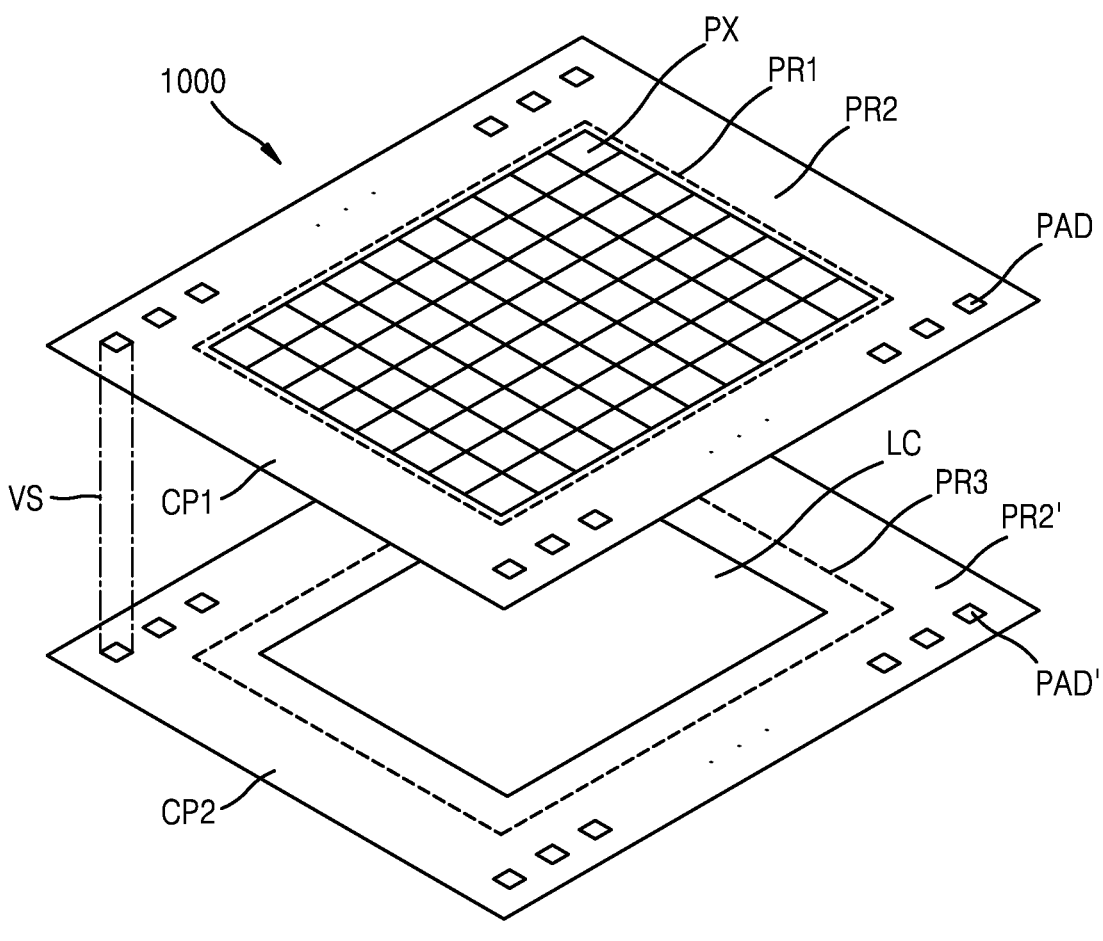
FIG. 13 is a schematic diagram of an image sensor according to an embodiment.

FIG. 13 is a schematic diagram of an image sensor according to an embodiment.

Referring to FIG. 13, an image sensor 1000 may be a stack image sensor in which a first chip CP1 and a second chip CP2 are stacked in the vertical direction. The image sensor 1000 may be an implementation of the image sensor 100 of FIG. 1, etc.

The first chip CP1 may include a pixel region PR1 and a pad region PR2, and the second chip CP2 may include a peripheral circuit region PR3 and a lower pad region PR2'. In the pixel region PR1, a pixel array, in which a plurality of pixels PX are arranged, may be formed. Each pixel PX may be the pixel 111 described with reference to FIG. 3.

The peripheral circuit region PR3 of the second chip CP2 may include a logic circuit block LC and a plurality of transistors. For example, the logic circuit block LC may include at least one of the row driver 120, the ADC 130, the ramp generator 160, the timing generator 170, and the buffer 180, which are described with reference to FIG. 1.

The lower pad region PR2' of the second chip CP2 may include a conductive pad PAD'. The conductive pad PAD' may be provided in plural, and the conductive pads PAD' may respectively correspond to upper conductive pads PAD. The conductive pad PAD' may be electrically connected to the upper conductive pad PAD of the first chip CP1 by a via structure VS.

The image sensor 1000 may further include a memory. The memory may be formed on the second chip CP2. However, one or more embodiments are not limited thereto. In contrast to the illustration of FIG. 13, the memory may be formed on a third chip distinguished from the first chip CP1 and the second chip CP2 and may have a structure in which the first chip CP1, the second chip CP2, and the third chip are stacked.

While the inventive concept has been particularly shown and described with reference to embodiments thereof, it will be understood that various changes in form and details may be made therein without departing from the scope of the following claims.

What is claimed is:

1. A comparator comprising:

a first input transistor comprising a gate connected to a first input node;

a second input transistor comprising a gate connected to a second input node;

a first load transistor comprising a drain connected to a drain of the first input transistor;

a second load transistor comprising a drain connected to a drain of the second input transistor;

a first shift transistor comprising a drain connected to a source of the first load transistor;

a second shift transistor comprising a drain connected to a source of the second load transistor;

a first bottom switch connected to the first load transistor in parallel;

a second bottom switch connected to the second load transistor in parallel;

a first top switch connected to the first shift transistor in parallel; and a second top switch connected to the second shift transistor in parallel;

wherein a threshold voltage of the first shift transistor is higher than a threshold voltage of the first load transistor.

2. The comparator of claim 1, further comprising:

a first auto-zero switch that is operable to connect the first input node to the drain of the first input transistor; and a second auto-zero switch that is operable to connect the second input node to the drain of the second input transistor.

3. The comparator of claim 1, wherein the comparator is configured to operate in a first auto-zero period, a first comparison period, a second auto-zero period, and a second comparison period, and wherein, in the first auto-zero period, the first comparison period, and the second comparison period, the first top switch and the second top switch are turned on, and the first bottom switch and the second bottom switch are turned off.

4. The comparator of claim 1, wherein the comparator is configured to operate in a first auto-zero period, a first comparison period, a second auto-zero period, and a second comparison period, and wherein, in the second auto-zero period, the first top switch and the second top switch are turned off, and the first bottom switch and the second bottom switch are turned on.

5. The comparator of claim 1, wherein the comparator is configured to operate in a first auto-zero period, a first comparison period, a second auto-zero period, and a second comparison period, and the first top switch, the second top switch, the first bottom switch, and the second bottom switch are turned on in a period other than the first auto-zero period, the first comparison period, the second auto-zero period, and the second comparison period.

6. An image sensor comprising:

a pixel array comprising a plurality of pixels;

a ramp generator configured to generate a ramp signal; and an analog-digital conversion circuit configured to convert a pixel signal, which is output from the pixel array, into a digital signal, the analog-digital conversion circuit comprising a comparator and a counter, wherein the comparator comprises:

a first input transistor comprising a gate configured to receive the ramp signal;

a second input transistor comprising a gate configured to receive the pixel signal;

a first load transistor connected to a source or drain of the first input transistor;

a second load transistor connected to a source or drain of the second input transistor;

a first shift transistor comprising a gate connected to the gate of the first input transistor and connected to a source or drain of the first load transistor; and a second shift transistor comprising a gate connected to the gate of the second input transistor and connected to a source or drain of the second load transistor, the first load transistor and the first shift transistor are configured to be selectively driven according to a first switching signal and a second switching signal, respectively, and the second load transistor and the second shift transistor are configured to be selectively driven according to the first switching signal and the second switching signal, respectively.

7. The image sensor of claim 6, wherein the source of the first load transistor is connected to the drain of the first shift transistor, and the source of the second load transistor is connected to the drain of the second shift transistor.

8. The image sensor of claim 7, wherein the comparator comprises:

a first bottom switch connected to the first load transistor in parallel and configured to be switched between open and closed states according to the first switching signal;

a second bottom switch connected to the second load transistor in parallel and configured to be switched between open and closed states according to the first switching signal;

a first top switch connected to the first shift transistor in parallel and configured to be switched between open and closed states according to the second switching signal; and a second top switch connected to the second shift transistor in parallel and configured to be switched between open and closed states according to the second switching signal.

9. The image sensor of claim 6, wherein the drain of the first load transistor is connected to the drain of the first shift transistor, and the drain of the second load transistor is connected to the drain of the second shift transistor.

10. The image sensor of claim 9, wherein the comparator comprises:

a first bottom switch connected to the first shift transistor in series and configured to be switched between open and closed states according to the first switching signal;

a second bottom switch connected to the second shift transistor in series and configured to be switched between open and closed states according to the first switching signal;

a first top switch connected to the first load transistor in series and configured to be switched between open and closed states according to the second switching signal; and a second top switch connected to the second load transistor in series and configured to be switched between open and closed states according to the second switching signal.

11. The image sensor of claim 9, wherein the comparator further comprises a pull-up switch configured to apply a power voltage to the source or drain of the first input transistor and the source or drain of the second input transistor.

12. The image sensor of claim 6, wherein the comparator further comprises:

a first auto-zero switch that is operable to connect the gate of the first input transistor to the source or drain of the first input transistor; and a second auto-zero switch that is operable to connect the gate of the second input transistor to the source or drain of the second input transistor.

13. The image sensor of claim 6, wherein a threshold voltage of the first shift transistor is higher than a threshold voltage of the first load transistor.

14. The image sensor of claim 6, wherein the comparator is configured to operate in a first auto-zero period, a first comparison period, a second auto-zero period, and a second comparison period, wherein, in the first auto-zero period, the first load transistor and the second load transistor are driven, and wherein, in the second auto-zero period, the first shift transistor and the second shift transistor are driven.

15. The image sensor of claim 6, wherein the comparator is configured to operate in a first auto-zero period, a first comparison period, a second auto-zero period, and a second comparison period, and wherein, in the first comparison period and the second comparison period, the first load transistor and the second load transistor are driven.

16. The image sensor of claim 6, wherein the comparator is configured to operate in a first auto-zero period, a first comparison period, a second auto-zero period, and a second comparison period, and a power voltage is applied to the source or drain of the first input transistor in a period other than the first auto-zero period, the first comparison period, the second auto-zero period, and the second comparison period.

17. The image sensor of claim 6, wherein the comparator is configured to operate in a first auto-zero period, a first comparison period, a second auto-zero period, and a second comparison period, and in the first comparison period and the second comparison period, the first shift transistor and the second shift transistor are driven.

18. A comparator comprising:

a first input transistor comprising a gate connected to a first input node;

a second input transistor comprising a gate connected to a second input node;

a first load transistor comprising a drain connected to a drain of the first input transistor;

a second load transistor comprising a drain connected to a drain of the second input transistor;

a first shift transistor comprising a drain connected to the drain of the first input transistor;

a second shift transistor comprising a drain connected to the drain of the second input transistor;

a first top switch connected to the first load transistor in series;

a second top switch connected to the second load transistor in series;

a first bottom switch connected to the first shift transistor in series; and a second bottom switch connected to the second shift transistor in series.

* * * * *